(12) United States Patent
Lindsay

(10) Patent No.: US 6,773,477 B2
(45) Date of Patent: Aug. 10, 2004

(54) PORTABLE MOTOR VEHICLE CABIN AIR PURIFIER

(76) Inventor: Marie DeHarpport Lindsay, 8905 SW. 149th Pl., Beaverton, OR (US) 97007

(*) Notice: Subject to any disclaimer, the term of this patent is extended or adjusted under 35 U.S.C. 154(b) by 0 days.

(21) Appl. No.: 10/111,129
(22) PCT Filed: Feb. 9, 2001
(86) PCT No.: PCT/US01/04241
§ 371 (c)(1), (2), (4) Date: Mar. 26, 2002
(87) PCT Pub. No.: WO01/66258
PCT Pub. Date: Sep. 13, 2001

(65) Prior Publication Data
US 2004/0031248 A1 Feb. 19, 2004

Related U.S. Application Data
(60) Provisional application No. 60/188,009, filed on Mar. 9, 2000.

(51) Int. Cl.⁷ .................................................. B03C 3/00
(52) U.S. Cl. .............. 55/385.3; 55/385.1; 55/473; 55/481; 55/316; 362/226; 350/276; 353/13; 128/419 P
(58) Field of Search .................. 55/385.3, 385.1, 55/473, 481, 385.2, 482, 385.102, 385.303; 362/226; 350/276; 353/13; 128/419 P; 96/134, 147, 152; 454/370, 156

(56) References Cited

U.S. PATENT DOCUMENTS

| | | | | |
|---|---|---|---|---|
| 5,332,426 A | * | 7/1994 | Tang et al. | 55/385.3 |
| 5,433,772 A | * | 7/1995 | Sikora | 55/385.3 |
| 5,509,853 A | * | 4/1996 | Wells | 454/370 |
| 5,618,323 A | * | 4/1997 | Shearn et al. | 55/385.3 |
| 5,762,665 A | * | 6/1998 | Abrahamian et al. | 55/385.3 |
| 5,810,896 A | * | 9/1998 | Clemens | 55/385.3 |
| 6,136,057 A | * | 10/2000 | Dang et al. | 55/385.3 |

* cited by examiner

Primary Examiner—Minh-Chau T. Pham
(74) Attorney, Agent, or Firm—Glenn C. Brown, P.C.

(57) ABSTRACT

A portable air purifier for reducing pollutants in the passenger cabin of a vehicle to concentrations at least as low as the US-EPA National Ambient Air Quality Standards for: carbon monoxide, ozone, nitrogen dioxide, sulfur dioxide, lead, and particulate matter; plus benzene to a European ambient air standard. The purifier includes an air inlet and air outlet in communication with the vehicle cabin, with air circulation provided by a DC electric motor/blower attachable to a vehicle power plug. The filter assembly includes a specified series of filter media packets and a HEPA filter. The machine's preferred location is in the center of a rear seat where it can serve as an armrest/console and be secured by a seat belt.

38 Claims, 26 Drawing Sheets

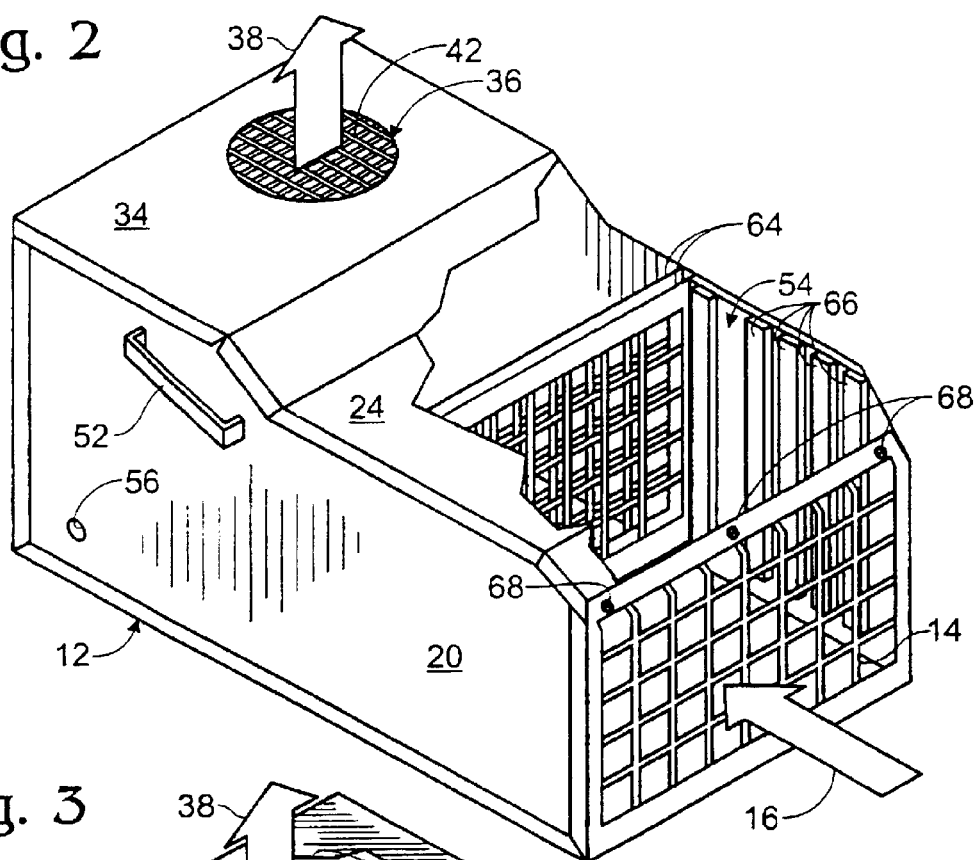
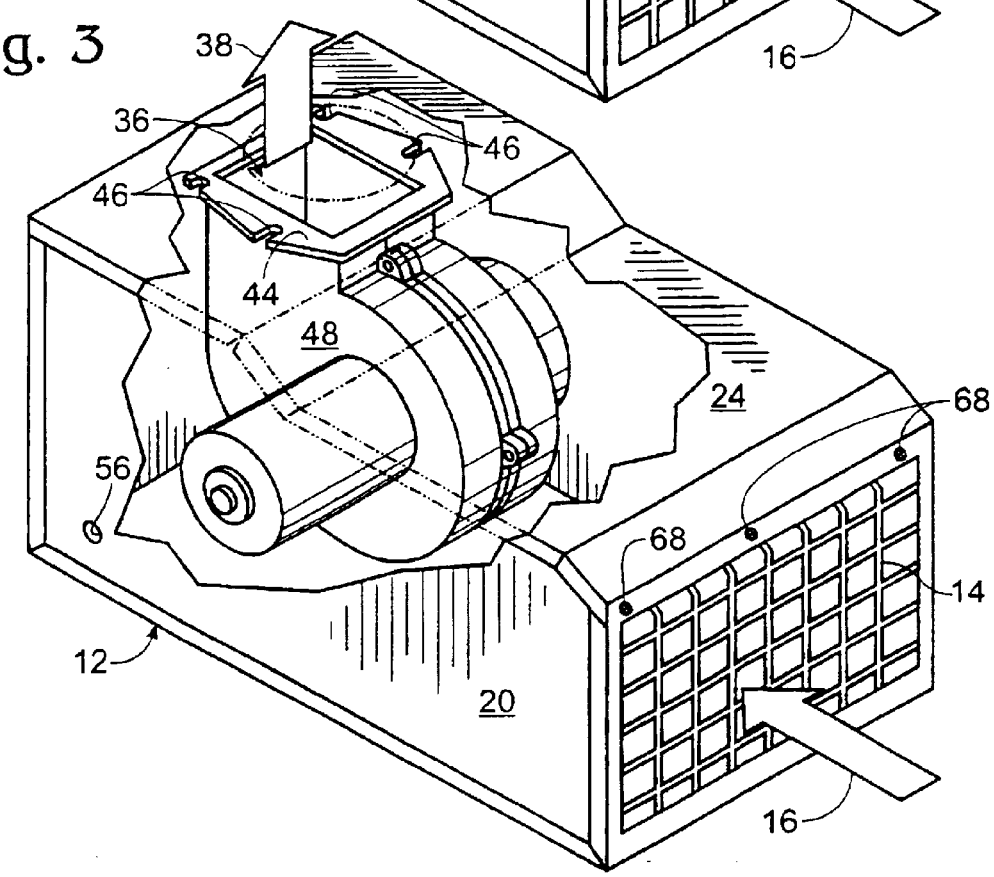

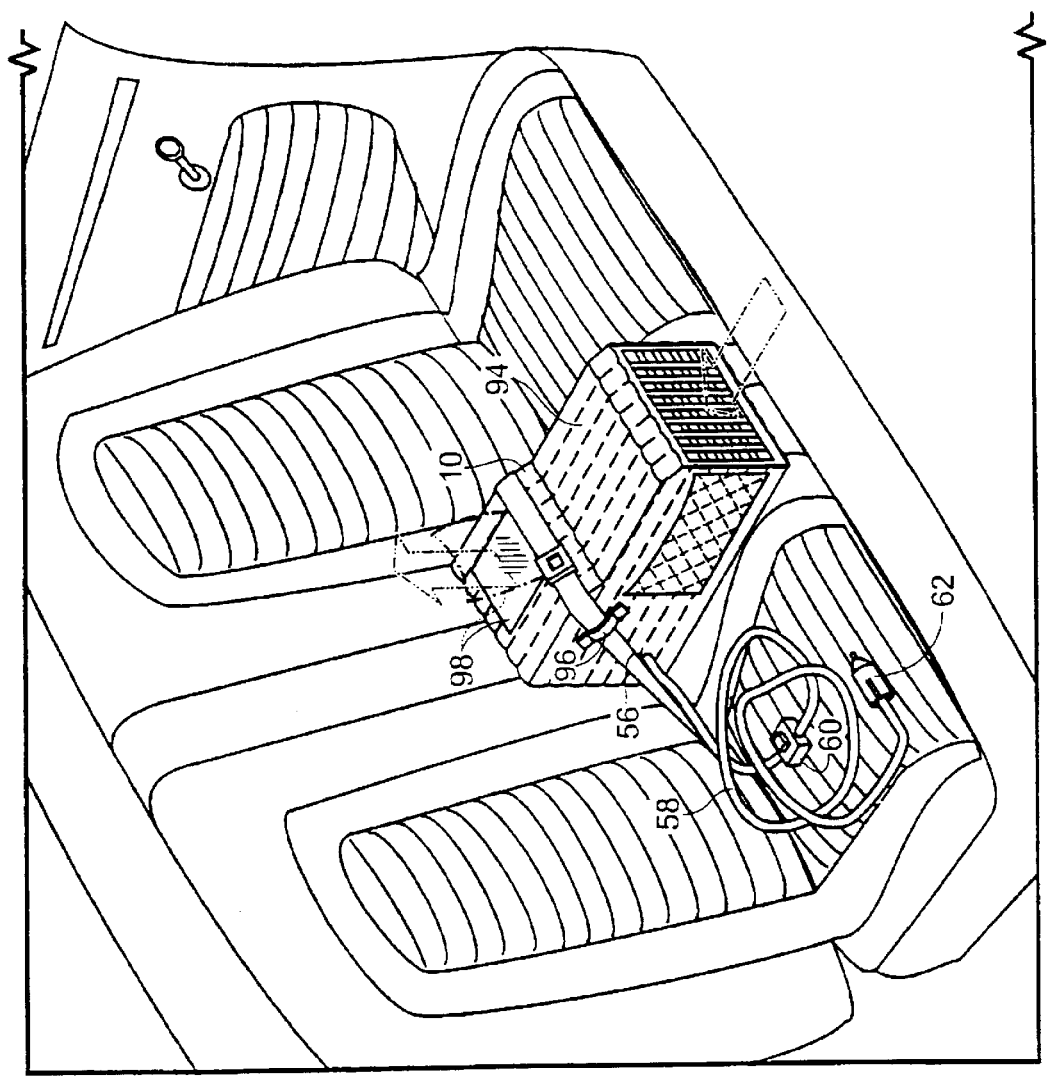

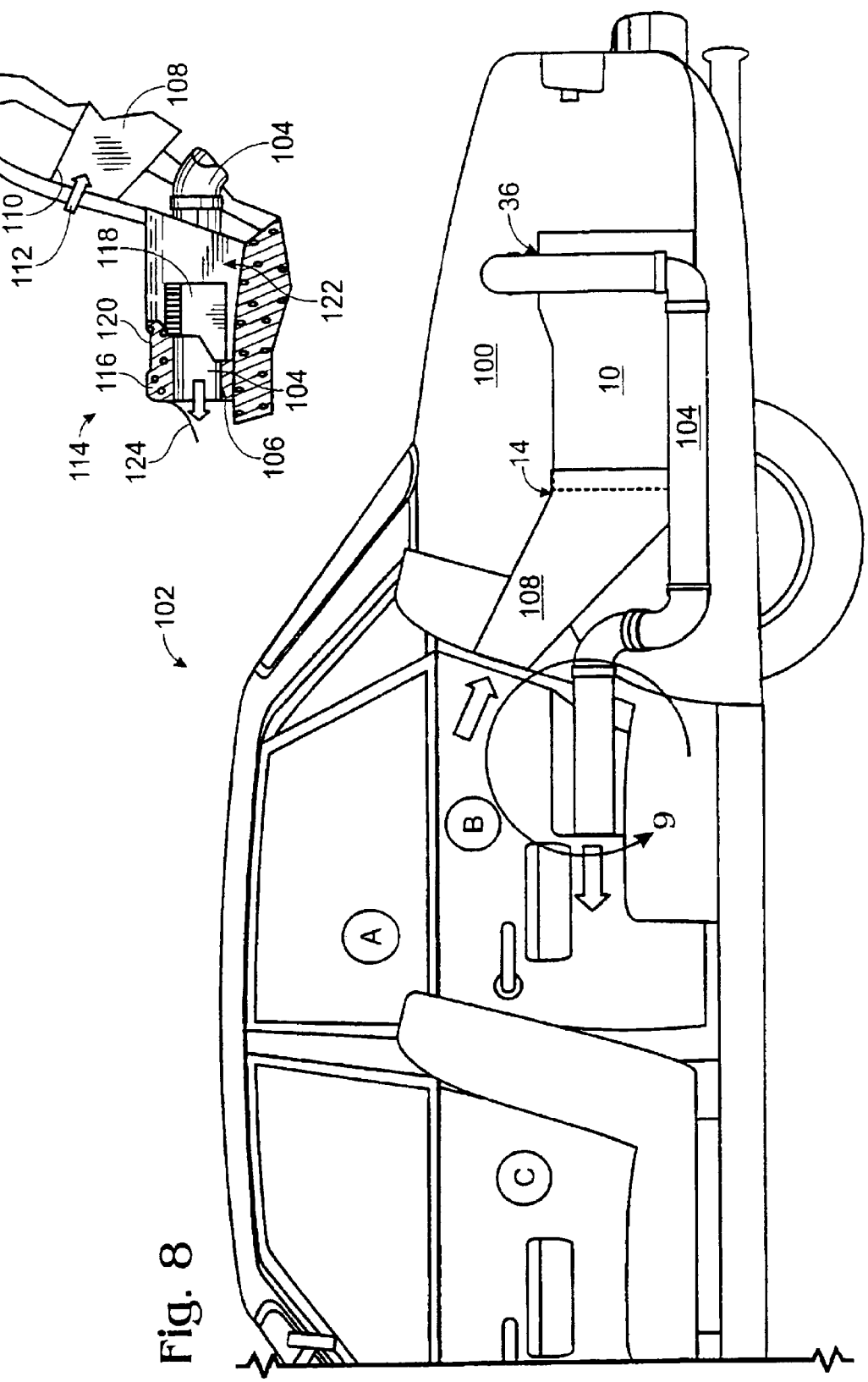

PM-10. 7 m³/min (250 CFM)
Bangkok, Thailand, 13 March, 2000

PM-10. 7 m³/min (250 CFM) -- Trunk
Los Angeles, Calif. 2 August, 1999.

Toluene. 7 m³/min (250 CFM). Los Angeles, 1 September, 2000 t-Butyl Methyl Ether. 7 m³/min (250 CFM).
Los Angeles, 1 September, 2000

Fig. 27
CONCENTRATION CHART – MAJOR POLLUTANTS TARGETED
HEALTH STANDARDS VS. LEVELS FOUND IN THE PASSENGER CABINS OF TRAVELING CARS

| Pollutant | Averaging Time | Government Ambient Air Health Standards: Holland | Government Ambient Air Health Standards: US EPA | Government Ambient Air Health Standards: California | Nine In-Car Studies: Without Purifier Peak | Nine In-Car Studies: Without Purifier Mean Range | Typical Performance: With Purifier Test Site | Typical Performance: With Purifier Mean ** |
|---|---|---|---|---|---|---|---|---|
| BENZENE | annual | 10 µg/m³ (3 ppb) * | none | | 766 µg/m³ (240 ppb) | 8 – 380 µg/m³ 5 – 240 ppb | Los Angeles | 2.3 µg/m³ (0.72 ppb) 1) |
| CARBON MONOXIDE | 1 hour | | 30 ppm (40,000 µg/m³) | 20 ppm (23,000 µg/m³) | 100 ppm | 3 – 46 ppm | Bangkok | 11.9 ppm 2) |
| | 8 hours | | 9 ppm (10,000 µg/m³) | | | | | |
| OZONE | 1 hour | | 120 ppb | 100 ppb * | 350 ppb | 10 – 177 ppb | Los Angeles Bangkok | 2 ppb 3) <25 ppb 4) |
| | 8 hours | | 80 ppb | | | | | |
| NITROGEN DIOXIDE | Annual | | 100 µg/m³(52ppb) | | | | Los Angeles | <100 ppb 5) |
| | 1 hour | | | 481 µg/m³ (250 ppb) * | 290 ppb | 20 – 140 ppb | Portland | <100 ppb 6) |
| SULFUR DIOXIDE | Annual | | 80 µg/m³ (140 ppb) | | | | Los Angeles | <320 ppb 7) |
| | 24 hours | | 365 µg/m³ (636 ppb) * | | 400 ppb | <320-400 ppb | Portland | <320 ppb 8) |
| LEAD | 3 months | | 1.5 µg/m³ * | | 3.1 µg/m³ | .2–1.3 µg/m³ | Los Angeles Portland | <1.0 µg/m³ 9) <0.65 µg/m³ 10) |
| PARTICULATE: PM 10 | 24 hours | | 150 µg/m³ * | 50 µg/m³ | 1044 µg/m³ | 20–370 µg/m³ | Los Angeles Bangkok | 9.14 µg/m³ 11) 37.4 µg/m³ 12) |
| | Annual | | 50 µg/m³ | | | | | |
| PM 2.5 *** | 24 hours | | 65 µg/m³ * | | 382 µg/m³ | 29–220 µg/m³ | Los Angeles Bangkok | 1.2 µg/m³ 13) 20.3 µg/m³ 14) |
| | Annual | | 15 µg/m³ | | | | | |

Fig. 28
FOOTNOTES TO THE CONCENTRATION CHART (Fig. 27)

\* -- Government standards in bold print on the previous page (Fig. 27) are the targeted concentration levels attained by the tests described below.

\*\* -- The numbered footnotes below describe the date and type of test for each of the pollutants.

1) Benzene: 90 minute mean concentration on 1 September, 2000, in Los Angeles using EPA method TO-14A, GS/MS, by Performance Analytical, Inc., collection by summa canister.
2) Carbon Monoxide: 5 minute mean concentration on 14 March, 2000, in Bangkok using Dräger Gas Analyzer.
3) Ozone: 4 minute mean concentration on 2 August, 1999, in Los Angeles using Ozone Spot Checker.
4) Ozone: 14 minute mean concentration on 14 March, 2000, in Bangkok using Dräger Gas Analyzer.
5) Nitrogen Dioxide: 60 minute mean concentration on 22 September, 2000, in Los Angeles using NIOSH method 6014 by Assay Technologies Lab., limit of detection.
6) Nitrogen Dioxide: 60 minute mean concentration on 25 September, 2000, in Portland using NIOSH method 6014 by Assay Technologies Lab., limit of detection.
7) Sulfur Dioxide: 60 minute mean concentration on 22 September, 2000, in Los Angeles using OSHA method ID-200 by Assay Technologies Lab., limit of detection.
8) Sulfur Dioxide: 60 minute mean concentration, on 25 September, 2000, in Portland using OSHA method ID-200 by Assay Technologies Lab., limit of detection.
9) Lead: 30 minute mean concentration, on 22 September, 2000, in Los Angeles using OSHA method ID-125 by Assay Technologies Lab., limit of detection.
10) Lead: 45 minute mean concentration on 25 September. 2000, in Portland using OSHA method ID-125 by Assay Technologies Lab., limit of detection.
11) Particulate (PM-10): 15 minute mean concentration on 2 August, 1999, in Los Angeles using a MIE DataRAM with PM-10 nozzle.
12) Particulate (PM-10): 35 minute mean concentration on 15 March, 2000, in Bangkok using a MIE DataRAM with PM-10 nozzle.
13) Particulate (PM-2.5\*\*\*): 9 minute mean concentration on 3 August, 1999, in Los Angeles using a MIE DataRAM with PM-2.5 nozzle.
14) Particulate (PM-2.5\*\*\*): 33 minute mean concentration on 15 March, 2000, in Bangkok using a MIE DataRAM with PM-2.5 nozzle.

\*\*\* -- Pollutants in this size category include sulfates, nitrates, elemental carbon (diesel exhaust), asbestos, lead, cadmium, mercury, fungi, bacteria, viruses, and volatile organic compounds (such as hydrocarbons) attached to sub-micron sized particles.

US 6,773,477 B2

PORTABLE MOTOR VEHICLE CABIN AIR PURIFIER

CROSS-REFERENCE TO RELATED APPLICATIONS

This application claims priority of Provisional Application Ser. No. 60/188,009 filed in the United States Patent and Trademark Office on Mar. 9, 2000, and which addresses the same subject matter.

STATEMENT REGARDING FEDERALLY SPONSORED RESEARCH OR DEVELOPMENT

Not Applicable

BACKGROUND OF THE INVENTION

1. Field of the Invention

This invention relates to the purification of air, particularly in the passenger cabins of motor vehicles, but also in hospitals, nursing homes, other health care environments, and industrial environments, and especially to the use of a plurality of packed bed filter media packets and a HEPA filter placed in a predetermined sequence within a portable air purifier that can be placed as a console/arm rest at selected locations within a motor vehicle cabin, or by some adaptation in a vehicle trunk or bed of a pickup truck, or placed in any of such other environments, and in the case of a vehicle the air purifier operates independently of the vehicle ventilation system.

2. Description of the Prior Art

The literature in the field of Indoor Air Quality (IAQ) may use the term "ambient air" to refer to the air within an indoor room, while in the context of air quality generally the term often refers to "outside air." For clarity, the term "ambient air" is used herein in the latter sense, and the air within the motor vehicle cabin that is to be purified is referred to as "cabin air," although that cabin air will of course be continually supplied with "outside" or "ambient" air by virtue of the vehicle ventilation system, open windows, or the like. More specifically, "ambient air" herein means that air through which the vehicle is being driven.

Considerable effort has been directed toward reducing air pollution inside the cabin of motor vehicles. With hundreds of different kinds of air pollutants around and inside motor vehicles traveling on congested highways, this is no easy task. Most of this effort has targeted dust, pollen, and some odors. Vehicle manufacturers in Europe, Japan and the USA now offer air filtration subsystems for the passenger cabins of some of their new automobiles. These subsystems are typically placed within the ventilation system of new cars and serve as gross particulate filters. Some of these subsystems also have small amounts of activated carbon to reduce odors. These ventilation subsystems are intended to capture particles that are 3 to 8 microns in diameter and larger, but they are not designed to reduce substantially the extensive fine (2.5 micron in diameter and smaller) particulate matter over any extended period of time.

Some of the particulate filters now being installed in the ventilation systems of new cars use electrostatic non-woven filter media. The electric charges on these media help to capture fine particulate matter; however, as the filter media fills, the charge and thus the effectiveness of such media are diminished. The majority of particles by number that appear in the cabin air environment in fact fall within the size range of less than one micron in diameter. These submicron particles are not effectively reduced by current ventilation subsystem designs, but yet they present the greatest health hazard to human beings since they penetrate deeply into the respiratory tract. Also, placement of filters that contain activated carbon within ventilation system does capture some gases, but with no specific standard of effectiveness for individual gases, the object seemingly being simply that of reducing "odors" for purposes of customer satisfaction, but with little or no thought being given to the reduction of any identified pollutants. One major limitation inherent in such systems also is that they have been designed to minimize pressure drop in order to maintain a strong flow of air, for purposes of heating or cooling, but as a result any actual fine particle purification of the air being circulated becomes minimal.

Some inventors have proposed stand-alone cabin air filter systems that are to be permanently mounted in the trunk, the rear window deck, or the ceiling (head liner) of automobiles. Again, most of these proposed systems are designed as gross particulate filters, with small amounts of activated carbon added to reduce smoke and generic odors. These, too, have had little or no capacity to rapidly filter and re-circulate cabin air. Some of these devices are small electronic air cleaners that target fine particulate matter, but also have the potential for generating ozone, itself a pollutant. Such devices also require frequent cleaning to prevent arcing and to minimize ozone production.

In most cases, the stand-alone devices of the prior art have had insufficient air flow to reduce substantially the continuing flow of pollutants that comes into the vehicle cabin through the ventilation system, and through leakage around doors and windows. No device heretofore proposed is portable, re-circulates cabin air at effective rates of cubic meters per minute ($m^3$/min) or the corresponding cubic feet per minute (CFM), and employs a specific sequence of filters that has been especially designed to remove specific pollutants, including fine particulate matter, lead, carbon monoxide, ozone, sulfur dioxide, nitrogen dioxide, benzene and other hydrocarbons. A number of the filters used in the invention are of the packed bed type, which type has a long history with respect to purifying air in buildings, but to the inventor's knowledge, there have been no successful attempts to adapt the packed bed technology to cabin air purification. Also, no prior art device intended for vehicle cabin air purification that is known to this inventor has targeted the specific air pollutants for which the EPA or other agencies have established ambient air quality standards, with the goal of reducing the concentration levels of those pollutants at least to below the defined health standards. This seems to have resulted (a) from not being aware until the last several years of the high levels of pollutants that are actually found in a vehicle cabin while driving through crowded urban streets; and (b) from emphasizing in research what particular vehicle manufacturers were doing about cabin air pollution rather than on what needed to be done if those high levels of pollution were to be reduced. Perhaps most significantly, the inventor is aware of no prior test data, such as those reported herein, in which an air purifier was installed in a vehicle that was then driven through the streets, while collecting air quality measurements both with the purifier operating and with it not operating, so that by comparison of those data a practical measurement of the efficacy of the purifier could be established.

Particular patents known to the inventor that relate to air purification, especially in the cabins of motor vehicles, will now be described. U.S. Pat. No. 3,722,182 issued Mar. 27, 1973 to Gilbertson touches on the use of an air filtering device mounted on the rear window deck of an automobile and functions independently of the heater/air conditioner/air intake (plenum) system of the vehicle. (An alternative embodiment that connects directly to the air intake of the vehicle is also described.) For removal of particulate matter, the device employs electrostatic plates, although in the more recent state of the art it is known that HEPA filters better serve that purpose, and do not require the frequent cleaning or replacement that is necessary for electrostatic systems.

U.S. Pat. No. 3,883,637 issued May 13, 1975 to Benedict describes an activated charcoal filter element having dispersed mixtures of copper and chromium oxides, chromates, dichromates and the like for purposes or removal of $H_2S$ and catalytically, similar air-borne sulfur compounds such as mercaptans, organic sulfides, thiophene compounds, thioethers and organic sulfoxides.

U.S. Pat. No. 3,870,495 issued Mar. 11, 1975 to Dixson, et al., describes the use of non woven fibers of wood, paper, hemp and the like to avoid having periodic gaps in the material as is characteristic of woven fabrics. Secondly, the filters are used in multi-layer or laminated form so as to block any gaps that might occur by way of manufacturing imperfections with respect to particular pieces of fabric.

U.S. Pat. No. 4,207,291 issued Jun. 10, 1980 to Byrd et al. describes the use of a fabric substrate impregnated with $MnO_2$ for the removal of ozone from the air in aircraft cabins.

U.S. Pat. No. 4,610,703 issued Sep. 9, 1986 to Kowalzyk describes a single filter installed within a vehicle heater/cooling system.

U.S. Pat. No. 4,629,482 issued Dec. 16, 1986 to Davis describes a portable air purifier for use in rooms (as opposed to vehicle cabins) that employs a HEPA filter for particulate removal and operates on AC power. The need to replace the filters after long use is shown to the user externally by the appearance of a pulsation in the air flow rate. At an initial stage with a clean filter, operation occurred at a measured air flow rate of 350 cubic feet per minute (CFM).

U.S. Pat. No. 4,658,707 issued Apr. 21, 1987 to Hawkins et al. describes an air purifier for vehicle interiors, disposed principally within the headliner, that includes a fan and smoke filters, together with a smoke detector that automatically initiates operation of the device upon the detection of smoke.

U.S. Pat. No. 4,722,747 issued Feb. 2, 1988 to Armbruster describes an air filter system to be mounted by bolts beneath the roof of a vehicle and including a pair of blowers dispersed at opposite ends of the device for blowing out air, an air intake opening in the middle, and both foam and activated charcoal filters interposed there between.

U.S. Pat. No. 4,917,862 issued Apr. 17, 1990 to Kraw et al. describes a filter system for the removal of mercury, bacteria, pathogens and other vapors, especially with respect to mercury vapors in a dental office. A sequence of filters includes a fibrous pre-filter, then a filter having a honeycomb structure or the like, within which a plurality of cells are partially filled with activated carbon pellets, and then preferably a post-filter. The quantity of pellets introduced may lie between 30% and 90% of the total cell volume, whereby the pellets are "swirled" in the air stream passing through the filter, this motion of the adsorbent pellets being intended to increase adsorbent-adsorbate contact. Operation of the device at air flow rates of at least 700 CFM is said to be preferred, although operation at rates up to 1200 CFM is also noted.

U.S. Pat. No. 5,004,487 issued Apr. 2, 1991 to Kowalzyk describes an air filter assembly for use in passenger compartments of motor vehicles that is installed within the vehicle heating/cooling system and is air pressure driven to clean the air coming into the vehicle. A sensor provides warning when the filter needs cleaning or replacement.

U.S. Pat. No. 5,192,346 issued Mar. 9, 1993 to the same inventor (Kowalzyk) employs a pleated flat filter to permit greater air flow.

U.S. Pat. No. 5,042,997 issued Aug. 27, 1991 to Rhodes describes an environmental control system for a building which includes an air filter that has a series of particulate filters and a chemical and activated charcoal filter.

U.S. Pat. No. 5,221,292 issued Jun. 22, 1993 to Aoyams describes an air cleaning system for vehicle passenger compartments which includes two air cleaners: a single air cleaner for cleaning passenger compartment air when the pollution level is low; and a second cleaner for conditions of high pollution within the vehicle is drawing in and cleaning outside air, while the first cleaner discharges compartment air to the outside.

U.S. Pat. No. 5,683,478 issued Nov. 4, 1997 to Anonychuk describes an air filter device featuring a bottom base unit having a hollow cylindrical filter unit to be housed within an existing blower motor assembly under the hood of a car.

U.S. Pat. No. 5,879,423 issued Mar. 9, 1999 to Luka et al. describes a filter system having a filter body in the form of a plate-like filter element exemplified by an "active carbon mat" disposed between at least two planar frame parts, wherein two such frame parts enclose the filter element and are then held together by snaps, the structure further permitting construction of an array of such filter elements in series, and the system as a whole being intended to be part of the air conditioning system of the vehicle.

Some effort has been made to provide air purification, or at least some attention to vehicle cabin air quality, in add-on or after-market devices. For example, the web site http://www.realgoods.com/shop/shop.1.cfm?dp=107&ts=1053857 operated by Real Goods offers a three-stage auto air filter that employs activated carbon, an electret charged medium, and a Zeolite VOC ("Volatile Organic Compounds") filter, but the efficacy of the device is not known, other than claiming to recycle the cabin air in about six minutes. The site http://www.realgoods.com/shop/shop.1.cfm?dp=107&ts=1053856 from the same company offers an auto ionizer to help precipitate air pollutants, but nothing is said about either air circulation or tested effectiveness. (Both sites visited Dec. 17, 2000.)

Some technical literature has also addressed cabin air purification, for example, in the article by Heinz H. Bitterman entitled "History and World Wide Trends in Cabin Air Filter Testing," published in *Fluid/Particle Separation Journal*, Vol. 3, No. 2, August 2000, pp. 152–155. This article points out the air test standards currently being employed in Europe, which are then compared to the less stringent U.S. standards. (The article notes, for example, that General Motors vehicles for the European market will have filtration for both particles and odors, whereas the American versions of such vehicles will only have particle filters.) The article also remarks that "if it could be managed to provide filters being effective with diesel soot, a major step to recognizable air quality improvement inside cars would be made," but only the use of activated carbon as a filter material, and not the HEPA filter, which the present data indicates is necessary (to remove the fine particulates onto which many of the other pollutants appear to adhere), is proposed to reach that goal. Bitterman also provides no experimental data collected from moving vehicles, as are the data provided herein.

An article by Tadeusz Jaroszczyk et al. entitled "Filtration Performance of High Efficiency Cabin Filters for Operators' Protection in Dusty Environments," published in *Fluid/Particle Separation Journal*, Vol. 3, No. 2, August 2000, pp. 156–164 (Jaroszczyk I), discusses the cabin air filtration systems of mobile mining equipment with respect to the efficacy of particular filter types, and also both recirculating and air intake ventilation systems. The article discusses minimum air flow rates (e.g., 43 m$^3$/hr=25.3 CFM), a "nominal" air flow rate of 100 m$^3$/h being used in the reported laboratory tests, filter pressure drops (e.g., 20 Pa), and "dust capacity," a parameter for use in high dust environments.

An article by Tadeusz Jaroszczyk et al. entitled "Media Needs for Automotive Cabin Air Treatment" published in *Proceedings, Filtration '94 Conference, American Filtration and Separations Society*, pp. 123–147 (Jaroszczyk II), sets out criteria that filter media should meet in order to be used in cabin air filtration. Particular stress is given to the constraints that are present in ventilation system filter design, in light of the (presumed) limited space available for such filtration, as well as a perceived need to maintain a high air velocity for purposes of heating, ventilation and air conditioning (HVAC), with the resultant short residence time of the air within the filter system being said to reduce filter effectiveness. The article indicates, e.g., (p. 125), that "conventional high efficiency filters operate at low filtration velocities and excessively large spaces would be required to accommodate these filters in a car," and(p. 126) that "current ventilation system designs do not allow for the incorporation of conventional high efficiency filters (HEPA) typically required if 'lung damaging' particles have to be removed."

The proposed solution, but for which no specific means are given, is noted (p. 130) as follows: "An independent car ventilation system with recirculating air flow should be used to control contaminants from internal sources. Filters in this system can be installed in the trunk, under the roof (in the headliner), or under the seats. Since there is more space in these locations, such filters can be larger than ventilation system filters. A low flow velocity in these filters can be maintained so that high filter and adsorber efficiency can be achieved." The article also discusses odor reduction and the air velocity values used in laboratory tests, indicating (pp. 145–146) that with respect to odor control, "under the flow conditions common in this application, adsorbent media did not have sufficient efficiency and life to remove challenge substances."

An article by Ogaki et al., "The Road Test of Car Cabin Filters in Japan," *Fluid/Particle Separation Journal* (American Filtration and Separation Society), Vol. 11, No. 1, April, 1998 (pp. 101–106) describes the testing of a number of filter types, including a two-layer dust removal type having a prefilter mainly composed of polyester fiber and a binder, and a micro fiber layer composed of melt-blown polypropylene. A four-layer type combines that dust removal type with another two layers intended to remove odors, comprising a layer of activated carbon granules disposed on a polyester backing layer. The article also sets out the Japanese Environmental Standard for suspended particulate matter (SPM) (which was said to be satisfied nowhere in Tokyo) and reports roadside measurements made by the Japanese Environment Agency for sulfur dioxide, nitrogen dioxide and hydrocarbons, as well as efficiency data for the various filters derived in this study, but no attempt is made to relate this efficiency study to the achievement of any environmental standard. Road tests of odor perception and dust concentration were also taken, and showed a clear correlation between odor perception and peaks in measured dust concentrations, the observance of these being attributed to vehicle exhaust gas.

An article by Samuel E. Lee, et al. of the Ford Motor Company entitled "Odor Filter Design Process," *Fluid/Particle Separation Journal* (American Filtration and Separation Society), V. 9 No. 3, October 1996, pp. 185–190, addresses cabin air filtration in terms of (1) the constraints (high air flow, low pressure drop, small package size) placed on any system that will be incorporated into a vehicle HVAC system and (2) customer perception of odors, without reference to any directed attempt to attain positive health benefits or the meeting of air quality standards. The article also states that "in most cases, the odor filter is intended as a customer comfort feature rather than a health and safety feature," and further that the filter design process is to depend significantly on "what the customer wants," which in turn is to be based on market research. Some laboratory comparisons of filter performance, at face velocities of approximately 0.75 m/sec and 340 m$^3$/hr flow rates, are also reported.

This industry emphasis on low pressure drops and customer comfort is probably best shown in a practice noted in the article by Olaf Kievit, "Cabin Air Filter Loading Under Real-Life Conditions," *Advances in Filtration and Separation Technology* (American Filtration and Separation Society), V.11, 1997, pp. 188–192, wherein the end of a filter's "useful life" is defined as that point at which the pressure drop exceeds 1000 Pa, which as to one test occurred after only 30 hours. The issue addressed by the present invention is not that of any such pressure drop, but rather the question of whether the filter is still able to reduce cabin air pollution levels to below government standards, under ambient air conditions in which those levels far exceed such standards when the invention is not in use. (It is shown by the present invention that the industry concern for low pressure drops may be misplaced—an air purifier external to the HVAC system of a vehicle can not only be provided, but can be provided so as to add further utilitarian and indeed aesthetic value to the vehicle. Placement of the air purifier external to the vehicle HVAC system eliminates that pressure drop as a major issue of concern.)

The web site http://www.epa.gov/ttn/amtic/pmspec.html, under the heading "A final draft copy of the "Particulate Matter (PM2.5) Speciation Guidance Document," at pp. 24–31 (pp. 15–22 as printed), describes in detail the general characteristics of PM$_{2.5}$ particles, identifies the "target species" for which speciation of the chemical components in test analyses of air is sought by the U.S. Environmental Protection Agency, and in particular identifies a very wide range of pollutants in this PM$_{2.5}$ category, and their sources, that become a part of our every day air. (Site visited Dec. 17, 2000.)

To emphasize further the social importance of this issue, more recent research has shown that the concentration level of major air pollutants in the passenger cabins of vehicles operating on congested highways is typically 1.5 to 10 times higher than the level found at nearby monitoring stations. The data in the following Table I (wherein MTBE is methyl-tertiary butyl ether, MQL means "below quantification limit," i.e. not detectable, and "LAS-X" is a type of optical particle counter) were reported by the California Environmental Protection Agency Air Resources Board as Release 99-18 on Jun. 10, 1999, as an Executive Summary entitled "Measuring Concentrations of Selected Air Pollutants Inside California Vehicles," of a research study that included data collection in both Los Angeles and Sacramento (only the Los Angeles data are shown here).

TABLE I

| Pollutant | Los Angeles In-Vehicle | Los Angeles Ambient |
|---|---|---|
| MTBE, $\mu g/m^3$ | 20 to 90 | 10 to 26 |
| Benzene, $\mu g/m^3$ | 10 to 22 | 3 to 7 |
| Toluene, $\mu g/m^3$ | 22 to 54 | 10 to 40 |
| $PM_{2.5}$, $\mu g/m^3$ | 29 to 107* | 32 to 64 |
| $PM_{10}$, $\mu g/m^3$ | 29 to 107* | 54 to 103 |
| Formaldehyde, $\mu g/m^3$ | <MQL to 22 | <7 to 19 |
| Carbon Monoxide | 3 to 6 | <MQL |
| Black carbon, $\mu g/m^3$ | 3 to 40 | na |
| LAS-X, tot. particles/$cm^3$ | 2,200 to 4,600 | na |

[*Added note: Because of the identity of these two entries, it is suspected that one of them is a typographical error, given that the $PM_{10}$ measurement necessarily includes measurement of particles 2.5 $\mu m$ or less, and these values could be the same only if the air contained no particles larger than 2.5 $\mu m$. (Most likely the figure for $PM_{10}$ is in error, since the $PM_{10}$ values found in the present tests when the apparatus comprising invention was not in use were substantially higher than those of Table I, and in any case $PM_{10}$ values are generally about twice $PM_{2.5}$ values.)]

Because the levels found at road-side monitoring stations in many major cities now exceed in themselves the health standards established by the U.S. EPA, the much higher levels of those same pollutants inside vehicles can present an even more significant health risk to passengers.

This same problem exists worldwide, and is rapidly getting worse. As just one example of that, the article "Urban Air Quality Management Strategy in Asia—Jakarta Report (World Bank Technical Paper No. 379, 1997), Jitetendra J. Shah and Tanvi Nagpal, Eds. pp. 1–2, has expressed the following in an Executive Summary to the report:

Larger and more diverse cities are a sign of Asia's increasingly dynamic economies. Yet this growth has come at a cost. Swelling urban populations and increased concentration of industry and automobile traffic in and around cities has resulted in severe air pollution . . . .

Jakarta's population doubled between 1981 and 1991 . . . . In 1995, the metropolitan area's population was 11.5 million. This growth was accompanied by a tremendous rise in the number of vehicles on Jakarta's roads from approximately 900,000 to 1,700,000 . . . .

These developments are reflected in the city's deteriorated air quality. Pollutant concentrations near the main roads and in the northern part of the urban area are sometimes extremely high. The highest values have been measured in the northern part of Jakarta, but many stations seem to be influenced by local sources. The bus terminals in Pulo Gadung and Cililitan both show average total suspended particles (TSP) values above 300 $\mu g/m^3$. Overall, traffic and industries are the main sources of air pollution in Jakarta. Total TSP emissions in Jakarta are estimated at 96,733 tons/year. Particulate matter of 10 microns or less ($PM_{10}$) emissions total 41,369 tons/year, and nitrogen oxide ($NO_x$) emissions are estimated at 43,031 tons/year. TSP concentrations are lower in the outskirts, averaging 100–150 $\mu g/m^3$. The annual TSP averages in the most polluted areas are 5–6 times the national air quality guideline. Resuspension from roads, diesel and gasoline vehicle emissions, and domestic wood and refuse burning are the main sources of particulate pollution. Drivers, roadside residents, and those who live near large sources are most severely affected.

High ozone concentrations, measured 30 to 40 kilometers outside Jakarta, indicate that secondary pollutants have developed as a result of NOx and VOC emissions in Jakarta . . . .

While attaching an economic value to morbidity and mortality stemming from air pollution can be difficult, there is anecdotal as well as estimated evidence to suggest that the health of Jakarta's residents is under assault. Dose response equations used for valuing health impacts reveal that $PM_{10}$ caused a total of 4,364 excess deaths, 32 million restricted activity days (RAD), 101 million respiratory symptom days (RSD), innumerable emergency room visits, asthma attacks, cases of bronchitis in children, and hospital admissions, at a total cost of about US $300,000 (based on Indonesian data) in 1990."

Those health risks will of course include the possible spread and inhalation of airborne infectious agents, particularly in the case of vehicles that accept transient passengers as part of their daily function, such as police cars, limousines, taxicabs and ambulances. The following Table II contains a listing of some well known such infectious agent, indicating both the scientific name of the agent and the particular infection(s) that each may cause, and were selected from Joan Luckmann and Karen Creason Sorensen, *Medical-Surgical Nursing: A Psychophysiological Approach* (W. B. Saunders Company, Philadelphia, 1987), 3d Ed., pp. 120–121.

TABLE II

| List of airborne infectious agents: | Infections: |
|---|---|
| *Corynebacterium diphtheriae* | Diphtheria |
| *Staphylococcus aureus* | Wounds, pneumonia, cellulitis, dermatitis, food poisoning, septicemia |
| *Streptococcus pneumoniae* | Lobar pneumonia, eye infections, meningitis, peritonitis |
| *Haemophilus influenzae* | Pneumonitis, pneumonia, meningitis |
| *N eisseria meningitidis* | Meningitis, pneumonia |
| *Mycobacterium tuberculosis* | Tuberculosis |
| *Cryptococcus neoformans* | Pneumonia, meningitis |
| Aspergillus species | Aspergillosis |
| Hepatitis B | Serum hepatitis |
| Herpes zoster | Chicken pox (primary) Shingles (recurrent) |
| Rubella | Rubella and rubella syndrome in newborns exposed prenatally |
| Enteroviruses | Poliomyelitis, aseptic meningitis |
| Myxoviruses | Influenza |

Such airborne pathogens are to be found in nursing homes and hospitals or the like as well, and as will be noted below, a portable embodiment of the invention equally finds application in that context.

With the exception of certain special purpose applications, such as the Kraw et al. patent that is principally concerned with mercury in dental offices, or the Benedict patent which treats only sulfur compounds (only one of which, sulfur dioxide, ranks as a major criteria air pollutant), and in spite of the EPA documentation of this pressing need for "speciation" of the offending materials, the prior art discloses little attempt to address the issue of motor vehicle cabin air pollution in terms of specific chemical elements or compounds, notably those that are know to be toxic, and/or for which standards for air purity have been defined.

The foregoing literature may be summarized by saying that efforts in the air purification industry, except perhaps in the mining environment and in industrial and office environments under the requirements of OSHA, have primarily emphasized customer satisfaction rather than health. Secondly, to establish minimum flow rates as standards (e.g., as mentioned in Jaroszczyk I, noted above) would appear at least to require more precise definition. If the flow rate is increased by increasing the air velocity rather than the filter cross section, the residence time of any particular segment of a gas will decrease and by that assumption the filter "efficiency" will decrease accordingly, as noted in Jaroszczyk II. Cited studies of filter efficiency also seem to be directed more towards demonstrating the greater efficiency of some particular company's product rather than contributing to any understanding of the problem, since one cannot draw any general conclusions from comparisons of studies that in one case use air velocities of 5 cm/sec (Jaroszczyk II, cited above) while another uses air velocities of 0.75 m/sec (Lee, cited above).

Even reported efficiency values are difficult to interpret. That is, the American Society of Heating, Refrigerating, and Air Conditioning Engineers, Inc. ("ASHRAE") defines one efficiency test method, while a newer penetration test by the "DOP" (dioctyl phthalate) method, DOP penetration being essentially the converse of the ASHRAE efficiency, may also be cited, and comparable values of these results are given in Table III below as set out by Hollingsworth & Vose Company (undated sales brochure) for a selection of that company's products:

TABLE III

| Grade # | ASHREA Efficiency | % DOP Pen. |
|---|---|---|
| HE-1113 | 90–95 | 35 |
| HF-0553 | 80–85 | 46 |
| HF-0513 | 80–85 | 48 |
| HF-0612 | 80–85 | 50 |
| HF-0493 | 60–65 | 88 |
| HF-0622 | 60–65 | 86 |

Using comparable methods, and taking this terminology at face value, an efficiency of 90–95% should mean a penetration rate of 5–10%, hence the figures just cited do not provide an adequate guide to filter performance except in purely relative terms.

In light of the foregoing, this inventor accordingly sought to develop and create an air purification device for use in vehicle cabins and elsewhere that would reduce the concentration levels of EPA—criteria pollutants therein to an amount at least less than the National Ambient Air Quality Standard (NAAQS) for each pollutant, as set by the EPA in terms of concentration levels above which the pollutant is presumed to create a health risk to human beings. The EPA had initially established a NAAQS for hydrocarbons, but that standard was subsequently abandoned in favor of a new category of air pollutants under the title "Toxics." Many hydrocarbons, including benzene, are toxic; benzene is indeed a Class A carcinogen, i.e. a proven human cancer causing agent. A study published by the South Coast Air Quality District in California determined that among all the air toxics measured inside the cabins of operating motor vehicles, benzene presented the greatest health risk for commuters in the Los Angeles basin. Therefore, it is an especially targeted pollutant for this invention.

Table IV below shows the pertinent NAAQS, the more stringent standards set by the State of California, or in the case of benzene, a standard set by The Netherlands for application in Europe (neither the EPA nor California appear presently to have an ambient air standard for benzene. Indeed at this time, as best known to the inventor, the EPA has set no ambient air standards for any toxics.)

(In Table IV, "$\mu g/m^3$" means "micrograms per cubic meter, "ppm" means "parts per million, "ppb" means "parts per billion," "PM 10" means a particle size of 10 micrometers or less in diameter, "PM 2.5" means a particle size of 2.5 micrometers or less in diameter, and the time periods on the right in the right hand column mean that measured concentration values averaged over the stated time periods should not exceed the standard shown in the middle column. These standards are set out in greater detail in FIG. 27.)

TABLE IV

| Air Pollutant | Concentration Level Standard | Government |
|---|---|---|
| Benzene | 10 $\mu g/m^3$ | The Netherlands, annual |
| Carbon Monoxide | 20 ppm | California, one hour |
| Ozone | 100 ppb (0.10 ppm) | California, one hour |
| Nitrogen Dioxide | 250 ppb (0.25 ppm) | California, one hour |
| Sulfur Dioxide | 636 ppb (0.636 ppm) | EPA, 24 hour |
| Lead | 1.5 $\mu g/m^3$ | EPA, quarter |
| Particulate Matter: | | |
| PM 10 | 150 $\mu g/m^3$ | EPA, 24 hour |
| PM 2.5 | 65 $\mu g/m^3$ | EPA, 24 hour |

Experimental Background

With respect to vehicle ventilation systems in general, in the experimental data to be discussed below, which indicate a reduction of air pollution to below defined standards when an embodiment of the present invention was in operation but pollution values in excess of the standards when that device was not in operation, measurements were made in a vehicle that had a filter system built in to its ventilation system and in most cases was in operation, but was not effective since the measured pollution levels when the embodiment of the invention then being used was not turned on still exceeded those standards.

Thus to this inventor, the prior art disclosed no systematic treatment of air purification technology that was at all adapted for application in vehicle cabins, but only the partial solutions as previously described. Suggestions as to what might ideally be done were not provided in any structural detail, evidently in light of the much greater emphasis on minimal "customer satisfaction" as a tool in marketing, and thus an unwillingness to invest in the development of truly effective filter systems. The data presented herein and elsewhere establish a long felt need, but one that is presently unmet. Thus, after experimenting with a variety of filter media, blowers and filter device designs and packaging, it occurred to the inventor that the sequence of filters could be as significant a factor as the type. Also, the structure of the filters ultimately employed by the inventor was made to combine two filtering processes, i.e., the "packaging" for one filter medium was provided by another material that would itself contribute a significant filtering effect. A 7 $m^3$/min (250 CFM) prototype of the invention having the desired filter sequence was then built and tested. Selected filter media packets were fabricated as hereinafter described and installed in the device, and their effectiveness was tested in the field in the Portland, Oreg. area. That same device was also tested in the Los Angeles area in August of 1999, when pollution was high. That prototype appears herein as the embodiment installed in the vehicle trunk as shown in FIG. 8.

Two smaller versions of that prototype were then constructed, one still with a 7 $m^3$/min (250 CFM) rated blower, and the other with a 5 m³/min (176 CFM) blower. These two prototypes, that are described as the portable embodiment herein, were field tested in Los Angeles, Portland, and Bangkok, Thailand. Exemplary results of these tests are described and shown below with reference to corresponding figures. Additional tests not shown here were also carried out, the results of which were uniformly consistent with those reported here.

SUMMARY OF THE INVENTION

The invention provides air purification apparatus that reduces substantially the amount of specific major air pollutants found inside motor vehicle passenger cabins or similar environments, thus to provide a lessening of human health risk and increased comfort for passengers in motor vehicles or persons in those other environments. In a motor vehicle, the apparatus is not added to the existing ventilation system, but has its own blower, which preferably operates at variable speed on 12 volts direct current. A preferred embodiment of the apparatus is portable and can be installed in any vehicle, operating through power from a cigarette lighter outlet or similar power source, or it can be wired directly into the vehicle's electrical system. In particular, in a multi-vehicle family, the air purifier is easily moved from one vehicle to another. The air purifier is of light weight, a preferred embodiment of which is adapted to be placed in the center of the rear seat where it can be secured by a seat belt, and can be used as a console and arm rest, with pouches thereon to hold personal articles, including the usual holders for small change, audio tapes and CDs, and also cup holders. If not desired for use as an arm rest or console, the device can be secured in any vacant seat location. Alternatively, the apparatus can be strapped to the floor, especially of a van or SUV (sport utility vehicle), or mounted in the trunk of a car using special ducting to draw air from the passenger cabin into the apparatus and thence from the apparatus back into the vehicle cabin.

A principal object of the invention is to maintain vehicle cabin air that is free of harmful levels of the respirable particles (fine particulate 2.5 microns and smaller in diameter size), noxious and/or toxic gases, and airborne infectious agents, which present substantial human health risk. The apparatus is not so limited in size or power that it has the severe pressure drop restrictions common to filters placed in the ventilation systems of vehicles. It substantially reduces specific incoming exhaust-related pollutants, as well as passenger-generated pollutants such as tobacco smoke, viruses and bacteria. The apparatus also has the substantial benefit of being able to filter and continuously re-filter air in the cabin, rather than have the filter operate on a one-pass basis as occurs within many ventilation system designs. The apparatus operates independently from, and will not adversely affect, any existing vehicle ventilation system.

Another object of the invention is to provide an air purifier device that operates as a high capacity linear air-flow system. The apparatus draws in cabin air through a large grate at a first end of an airtight housing, and then passes that air through an air conduit that contains 3 to 5 individually fabricated and aligned filter media packets that contain in a pre-determined sequence at least gross particulate media (i.e., some fine particulate material may also be captured), desiccants, adsorbents, chemisorbents, and catalysts, as well as a deep pleated HEPA particulate filter and a post-filter. (Except where the context indicates otherwise, the term "sorbent" is used hereafter so as to encompass both adsorption and absorption). A 5 m³/min (176 CFM)—7 m³/min (250 CFM) rated 12 volt DC blower pulls the air through that air conduit. The resulting air is then expelled through an outlet at the top of the purifier housing, which outlet may preferably be of about 7.6 cm. (3 inch) diameter. Wiring includes a switch to vary the blower speed, installed in series on an electrical cord that connects the air purifier with the cigarette lighter outlet in the vehicle or a similar power source. If portability of the device is not sought to be retained, the wiring can be connected directly to the vehicle electrical system. The blower is preferably shock mounted, using gaskets on either side of the motor mounting plate to reduce noise and provide air seals.

Yet another object of the invention is the reduction of cabin air pollutants to meet EPA, State of California, and European Ambient Air Quality Standards. That object is found to be accomplished through the use of a uniquely designed sequence of filter media packets that was especially conceived for this device. The preferred sequencing of filter media packets as shown below has been identified through repetitive testing, although the sequence can be modified to treat a less demanding pollutant mix targeted in certain geographical areas during particular seasons of the year:

1. Desiccant-sorbent packet containing various types of silica gel, zeolite and/or molecular sieves, within an at least gross particulate medium envelope.
2. Sorbent packet containing various types of packed activated carbon granules or pellets, within an at least gross particulate medium envelope. (The term "carbon particle" is used hereinafter to encompass both pelletized and granular carbon, and also any other particulate forms of carbon as may be known to a person of ordinary skill in the art.)
3. Catalyst packet to break down carbon monoxide, within an at least gross particulate medium envelope. To function properly the catalyst packet must be preceded in the air-flow stream by desiccants to reduce moisture and by sorbents to capture sulfur and other acids which could poison the catalyst and make it inoperative.
4. Sorbent packet containing various types of coconut based activated carbon granules, beads, and/or powder, within an at least gross particulate medium envelope.
5. HEPA pleated filter (tested to remove 99.97% of particles measuring 0.3 microns in diameter, and more efficient for both smaller and larger particles), about 7.6 cm. (3 inches) deep.
6. A second filter of the type indicated in 4 above, or a coconut-based carbon impregnated fiber medium, to capture any residual gases and odors.

The use of the above filtering means in the indicated sequence will decrease passenger cabin air pollutants across a broad spectrum, and meet the specific health standards for ambient air shown above in Table I. In particular, the effective reduction of diesel exhaust fumes, which generally comprise fine particulate matter to which a variety of toxic and/or noxious substances are adhered, require both the sorbent filter media and the HEPA filter. The use of adsorbents and chemisorbents will filter out nitrogen oxides including nitrogen dioxide, sulfur oxides including sulfur dioxide, and many harmful hydrocarbons, especially including aromatic hydrocarbons such as benzene and toluene. The HEPA filter, which is essential for capturing and holding $PM_{2.5}$ and smaller (the fine respirable) particles, will remove a wide range of pollutants, including the following:

a) heavy metals such as lead, cadmium, mercury and asbestos;
b) noxious gases that attach to tiny particles such as sulfate and nitrate precipitants from gasoline and diesel engines and coal fired utility plants;

c) disease-causing microorganisms, including both bacteria and viruses, as well as fungi.

The foregoing objectives are met by the present invention by providing the following features:

1. a uniquely effective and long-lasting filter sequence for removal of fine particles and specific gases inside vehicle cabins to meet government health standards for ambient air;
2. accomplishment of the above goal with a portable, stand-alone air purifier that can be installed in existing vehicles as an after-market add-on rather than being built into the ventilation system of new cars;
3. location of the purifier in a convenient and safe place inside the cabin, particularly in the center of the rear seat, so it also can serve as an armrest or console. This placement allows enough space for the device to be fitted with a powerful motor and many different filter media, hence the air circulation is sufficient to accomplish the filtration goal; and
4. alternative location of the purifier in the vehicle trunk, with ducted air fluidly connected to the vehicle cabin, a structure that isolates the blower from the vehicle passengers while still providing effective air purification and a convenient console.

Proper and most efficacious use of the apparatus (hereinafter designated as an air purifier) as well as adequate evaluation of its utility, requires an understanding of what are the relevant data, along with actual measurements of air purity. Reference in the prior art as to the number of times within so many minutes that the air within some particular volume is exchanged, even though that parameter is widely used as a marketing tool, provides no information whatever about the reduction of air pollution within a vehicle, given that such parameter could as well be used to describe the performance of a simple fan. The same is true of air flow rate standards, since the air flow rate is simply another way of expressing the rate of air exchange within a given volume. It is not some purported "efficiency" of a filter that is sought, but rather a maximum removal of pollutant. That is accomplished in part by using the most effective filter media available, of course, but also by providing as much filter medium as may be practical, which relates to the number, cross-sectional area, and depth of the filters used.

The motor vehicle cabin also presents a particularly difficult problem in reducing air pollution, since the vehicle cabin is not a closed system, but "new" air is continually being drawn into it through the vehicle ventilation system. Ventilation systems that have a "recirculate" mode will tend to decrease the amount of such "new" air that is being drawn in, of course, but there will still be some amount of "new" (and polluted) air being drawn in. It is thus only by a comparison of the air quality within the vehicle cabin at times that an air purifier is turned on, as compared to like data when no air purifier is operating, that any adequate measure of the performance of an air purifier can be acquired. (This also suggests, of course, that to attain higher purity air within a vehicle cabin, the ventilation systems should in fact be operated in that "recirculate" mode.)

BRIEF DESCRIPTION OF THE DRAWINGS

FIG. 2 is perspective view of the air purifier of FIG. 1 with the top closed, and showing in cutaway an interior portion thereof that accommodates the filter media packets.

FIG. 3 is another perspective, partially cutaway view of a differently partially assembled air purifier with the top closed, showing in this case the blower inside.

FIG. 7 shows the complete air purifier, including upholstery, seat belt loops, and a flap over the clean air outlet, installed in the center of the rear (bench) seat of a motor vehicle.

FIG. 8 shows an alternative embodiment of the air purifier as installed in the trunk of an automobile, also showing the locations within the vehicle at which test instruments were located for conducting air purity test measurements.

FIG. 9 shows in cutaway the interior construction of the console portion of the alternative embodiment of the air purifier of FIG. 8.

FIG. 27 is a summary concentration chart of test results in the cities of Portland, Oreg., Los Angeles, Calif., and Bangkok, Thailand, using the detector locations shown in FIG. 8, as these results are indicated in FIGS. 10–26, and further indicating the related government health standards (in bold).

FIG. 28 incorporates footnotes to FIG. 27, indicating the times and places of the respective measurements or sampling, the particular instrument or sampling method used, and, where applicable, specifying the independent and certified laboratory that carried out a subsequent analysis and the method used.

BEST MODES OF CARRYING OUT THE INVENTION

Figure 1:
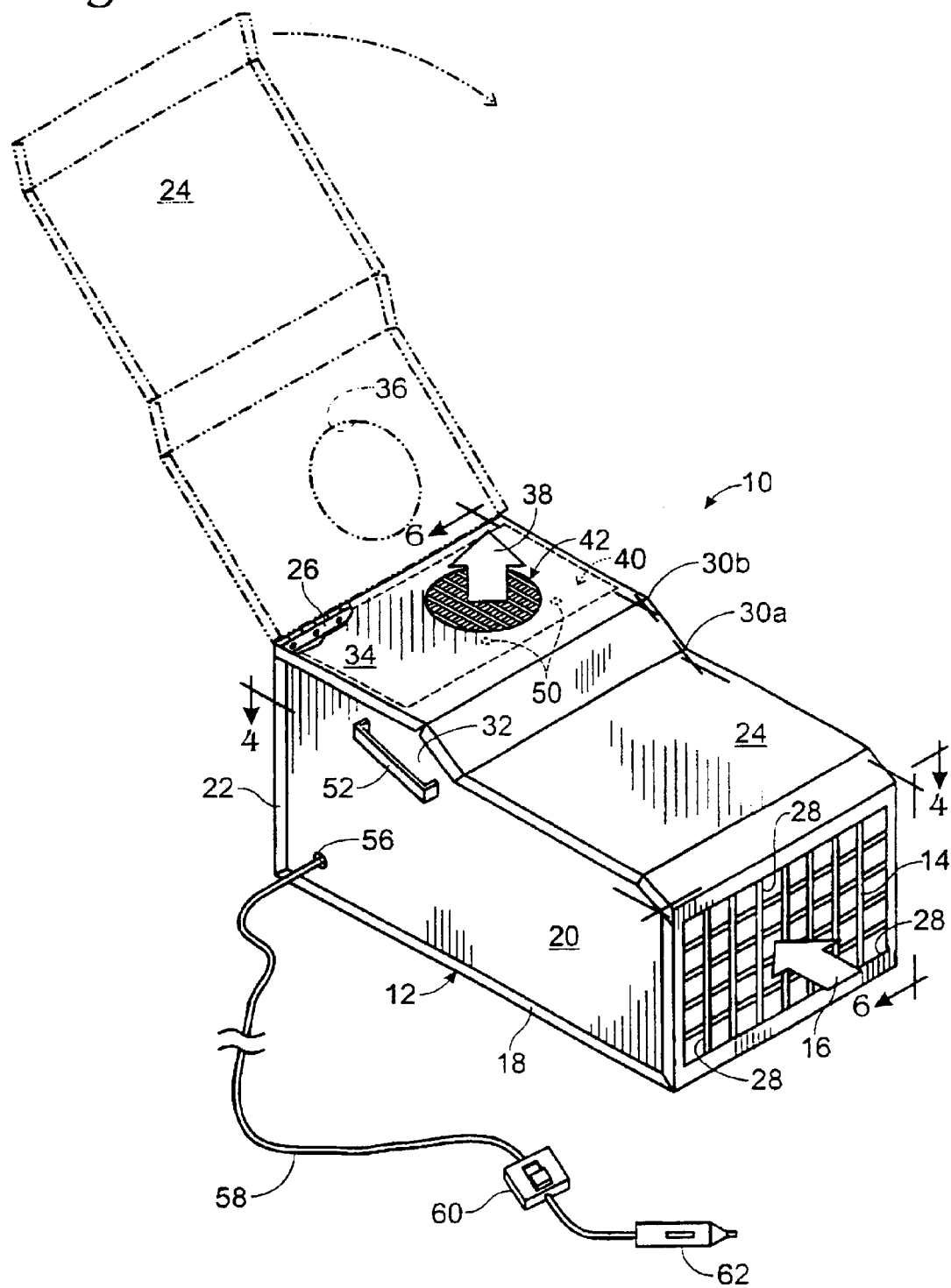
FIG. 1 is a perspective view of the complete air purifier (without upholstery), showing in outline the opening of the top thereof.

FIG. 1 shows the overall construction of air purifier 10, which is a self-contained unit in the sense that an air inlet, an array of filters, a blower and an air outlet are all contained therein, the only additional relationships to the motor vehicle itself being (a) means for removably attaching air purifier 10 to a selected surface within the motor vehicle; and (b) for operational purposes, connection of air purifier 10 to a power source derived from the motor vehicle. If employed in a stable environment other than a motor vehicle or a boat or the like (e.g., a hospital room), actual attachment of air purifier 10 to the location site may not be necessary.

Further in FIG. 1, the indicated housing 12, which conveniently may be in the shape of an elongate rectangular box, can be fabricated from lightweight aluminum plate by cutting, bending and riveting into the desired shape, or as an alternative from molded plastic. Housing 12 is seen to comprise a grated front plate 14 into which cabin air is to be drawn as shown by arrow 16; a bottom plate 18; two side plates 20 (of which only one is shown in FIG. 1); a rear plate 22; and a top plate 24. Bottom plate 18, side plates 20 and rear plate 22 are cut and bent as indicated above and then riveted or otherwise connected together into the disposition shown in FIG. 1, while top plate 24 is attached to the top edge of rear plate 22 with a hinge 26 as shown in FIG. 1 in cutaway. By the use of hinge 26, top plate 24 can be raised into an "open" position as shown in outline in FIG. 1 so as to provide access into housing 12 for initial assembly, and also for the installation and removal of filter media packets as will be discussed below.

In one embodiment of this aspect of the invention, front plate 14, which for example may be 8"×10" (20.32 cm×25.4 cm) in dimension, may contain 48 one-inch square rectangular holes 28 in a 6×8 array, or alternatively front plate 14 may have different dimensions and contain 40 holes 28 in a 5×8 array as shown in FIG. 2, such holes 28 in either case preferably having been stamped out of a flat aluminum plate, and serving to allow cabin air to enter housing 12 as noted above. In either such embodiment, however, or in any other disposition of holes 28, it is essential that front plate 14 and the filters to be discussed below have the same number of holes, in the same geometry, and that such holes be placed in alignment in passing from front plate 14 through those filters as will be described hereinafter.

Top plate 24 has two mutually parallel transverse bends 30a, 30b therein, and the two sides 20 have vertical extensions 32 (of which only one is shown in FIG. 1) that are dimensionally matched to the bottom profile of top plate 24. Vertical extensions 32 are intended to come into air-tight juxtaposition with top plate 24 when the same is in a "closed" disposition. Bends 30 and vertical extensions 32 serve to enlarge the vertical dimension of housing 12 in the rearward portion thereof so as to yield an elevated portion 34 under which can be accommodated a blower that exceeds the vertical dimension of housing 12 in its frontward portion, but of course that form of construction acts only to increase that vertical dimension would not be necessary were a smaller blower to be used.

Generally centrally located within elevated portion 34 is an air exit hole 36, being preferably of about 8.9 cm (3.5") in diameter, disposed within elevated portion 34 so as to allow purified air to flow out of housing 12 as indicated by outgoing air arrow 38. As shown in partial cutaway in FIG. 1, immediately beneath air exit hole 36 is a sieve plate 40 that connects at opposite ends thereof by rivets or similar well known means to inner sides of opposite vertical extensions 32, sieve plate 40 including a sieve 42 that is placed into alignment with air exit hole 36 to prevent any objects from falling into air purifier 10. As is best seen in FIG. 3, blower mounting frame 44 is disposed beneath and coaxially with air exit hole 36, and has holes 46 passing therethrough to permit mounting of blower 48 to sieve plate 40 by bolts 50 or similar such means.

Also shown in FIGS. 1 and 2 is one of two belt holders 52, a second belt holder 52 (not shown) being disposed in a mutually facing relationship on the opposite, non-visible (in FIGS. 1 and 2) side of housing 12. Belt holders 52 allow a seat belt (shown in FIG. 7) to be passed therethrough so as to hold air purifier 10 in a desired position on a vehicle seat, e.g., in the center of a rear bench seat of a motor vehicle. Such a "seat belt" is also installable at other locations within a vehicle as, for example, on the vehicle floor between two front seats, and in that case air purifier 10 could be installed between those two seats. FIG. 2 shows air purifier 10 with top plate 24 in a "closed" position, together with a cutaway portion depicting an air conduit 54 for installation of the filter media packets and the HEPA filter to be noted below.

Further shown in FIGS. 1–3 is a power inlet hole 56 through which passes a power cord 58 connecting within housing 12 to blower 48, there also being a switch 60 disposed along power cord 58 exterior to housing 12, and finally a power plug 62 that inserts into a cigarette lighter aperture (not shown) of a motor vehicle so as to provide electrical power to blower 48. Switch 60 may be a simple "on/off" switch, or may preferably be a step switch that permits adjustment in the level of electrical power being provided to blower 48, and in such case blower 48 would have a variable speed motor whereby the rate of operation of air purifier 10 could be adjusted as desired. For safety purposes, any resistors used to divide or adjust the power should be located within housing 12 rather than in switch 60. Power cord 58 can preferably be 2.44 m (8 feet) long, and in a preferred embodiment power cord 58 would be connected to a three position switch 60, with an extension of approximately 25.4 cm (10 inches) thereof from switch 60 to power plug 62, which preferably contains a 10-amp fuse.

Also shown in FIG. 2 within air conduit 54 is one instance of a filter framework 64, which as shown is simply two grates that in the embodiment from which the experimental data to be shown below were taken had the same construction as front plate 14. As will be shown in FIG. 5, however, a newer embodiment is now known to be more preferred, in which the two grates differ in construction, but in any case between such grates there is to be placed a particular filter medium packet as will be described below. Filter framework 64 is shown here with no filter medium packet therewithin simply to show the construction of the grates initially used, and also to illustrate the positioning of the filter media packets within pre-determined filter locations as will be discussed below.

Further provided within air conduit 54 is an array of separator plates 66, in the space between which (that space comprising a "filter location," including slots) are to be placed additional filter media packets, in a like manner, separator plates 66 being attached to facing inner surfaces of side plates 20 in a mutually facing manner by riveting or similar well known means. The indicated space between separator plates 66 is termed a "filter location." In FIGS. 2, 3 are also shown screws 68 that can be tightened down to hold a front edge of top plate 24 firmly onto front plate 14 so as to attain air tightness after the HEPA filter and filter media packets have been installed, and top plate 24 has been placed in its "closed" position, thus to permit normal operation of air purifier 10.

Figure 4:
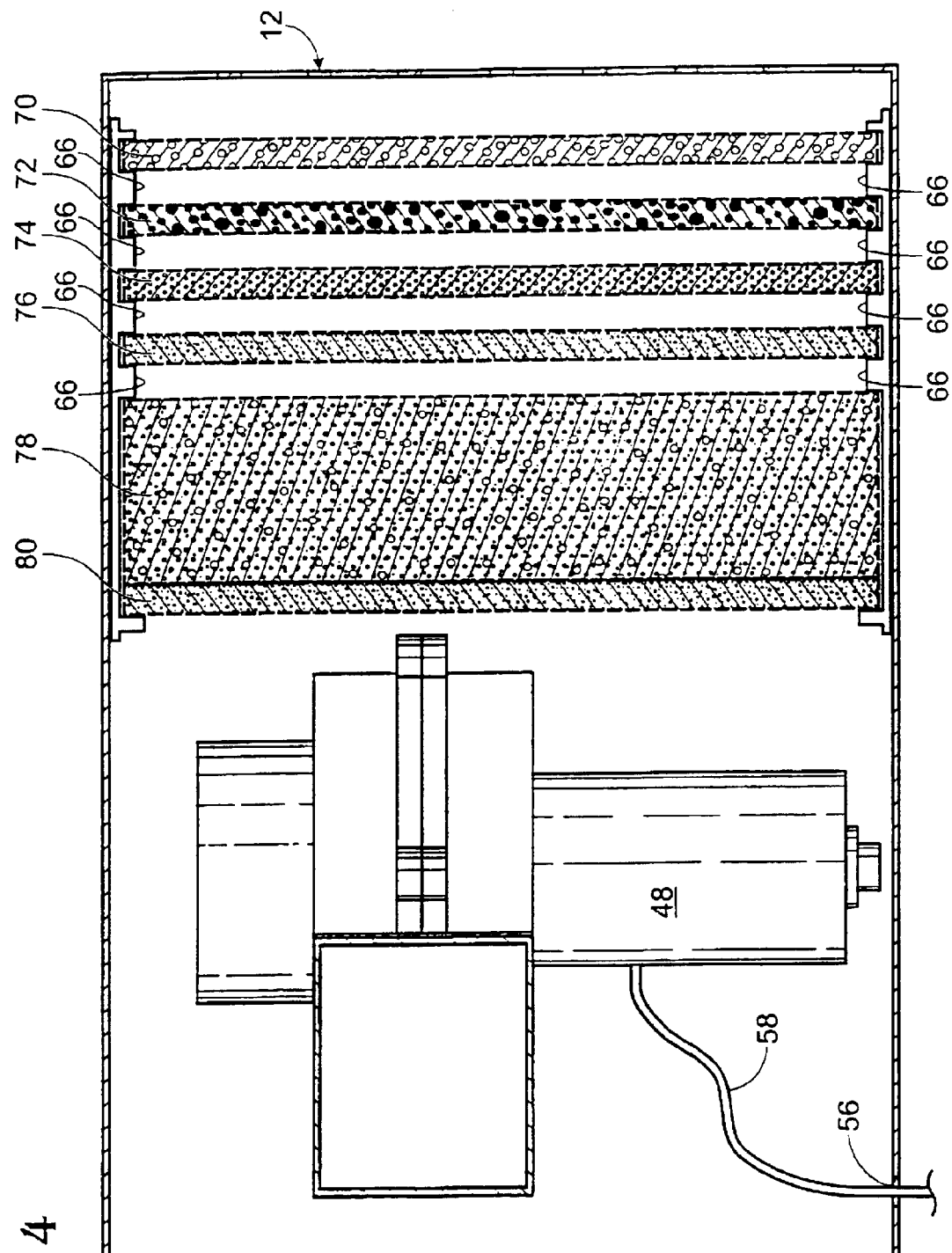
FIG. 4 is a longitudinal cross-sectional view in top plan of the complete air purifier, taken along the lines 4–4' of FIG. 1, and showing the blower, five filter media packets, and a HEPA filter.

FIG. 4, which is a longitudinal cross-sectional top plan view of air purifier 10 taken along the lines 4–4' of FIG. 1, shows within air conduit 54 the preferred arrangement of individual filters and filter media packets, i.e., dessicant-sorbent packet 70, carbon particle packet 72, catalyst packet 74, coconut based carbon packet 76, HEPA filter 78, and impregnated carbon filter 80 (also coconut based), which is placed immediately adjacent the exit side of HEPA filter 78. HEPA filter 78 is factory made, while filter media packets 70–76 and carbon impregnated filter 80 were hand assembled.

Figure 5:
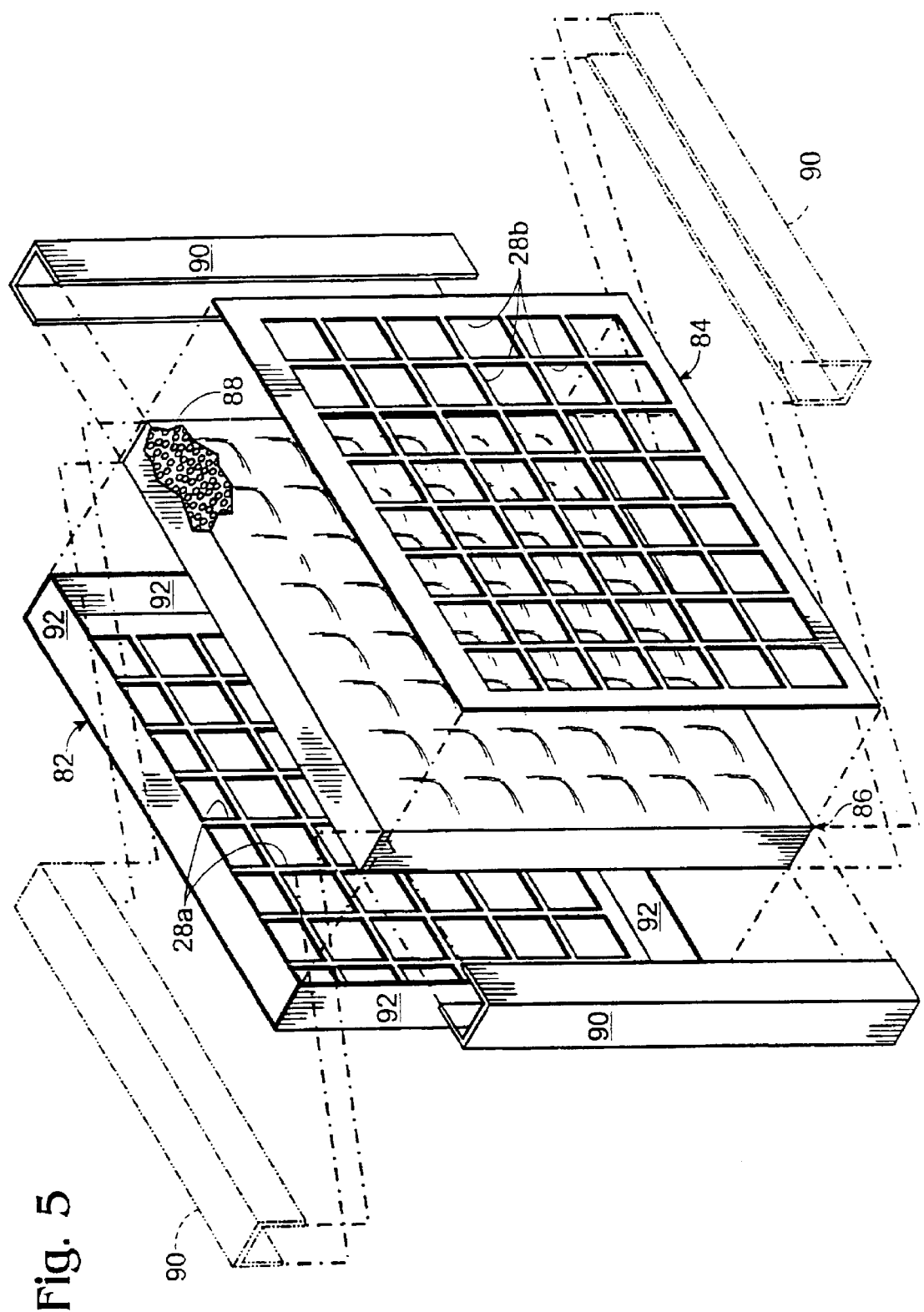
FIG. 5 is a perspective, exploded view of the manner of construction of a filter medium packet.

As shown in FIG. 5, the preferred assembly of each filter media packet, which may but need not have a rectangular structure, may include the use of first and second 20.3 cm×25.4 cm (8"×10") grates 82, 84, which preferably may be formed from aluminum sheet and are used similarly to the manner previously shown to comprise filter framework 64 in FIG. 2. Grates 82, 84, which respectively include first holes 28a and second holes 28b which have a size and location to form a mutually facing relationship with holes 28 of front plate 14, are to be disposed within selected filter locations between 1 cm (⅜") separator plates 66, separator plates 66 being disposed along inner surfaces of walls 20 within air conduit 54 as shown in FIGS. 2, 4. Filtering means will be placed between each pair of grates 82, 84, which filtering means will include a sealed filter medium envelope 86, preferably of a non-woven, filter material that will at least remove gross, if not fine, particulate matter, and preferably having a weight about 70 gm/m², the material used in the embodiments with which the tests to be described below were carried out having been a material produced by Technostat, although other types and sources of materials of which filter medium envelope 86 is formed, and that might be substituted for that just described, will be known to a person of ordinary skill in the art, and any such substitutions would be deemed to fall within the spirit and scope of the invention. Each of filter medium envelopes 86 will be filled with close to 0.53 liter (2.25 cups) of a granular or pelletized filter medium 88 (the term "carbon particle" being used to encompass either form) selected from the several types that were shown above to characterize filter medium packets 70–76, said filter medium 88 being shown in cutaway in FIG. 5, and the filter medium envelope 86 so filled will be placed between grates 82, 84 as is also shown in the exploded view of FIG. 5. The combination of grates 82, 84 and a filter medium envelope 86 containing filter medium 88 is termed a "filter structure."

In assembling each filter media packet, each filter medium envelope is vibrated and compacted to ensure that a full and even amount of granular or pelletized material is contained between each grate from top to bottom and side to side. Also, the quantity of filter medium used, and hence the thickness of a filled filter medium envelope 86, is such as to cause those portions of filter medium envelope 86 that are adjacent to holes 28a, 28b to bulge outwardly therefrom, and as shown in FIG. 5, the relative amounts of those bulges will give a visual indication that the filter medium has in fact been distributed evenly and tightly throughout the filter medium packet. This is critical to the proper functioning of these filter media packets so that vibration of air purifier 10 when in use in a moving vehicle cannot disturb filter medium 88 so as to create voids through which air that would not be filtered could pass. It is also elemental to the concept of the filter medium packet that as much medium surface be exposed to the air passing therethrough as is possible, hence it is important that as much medium be used as the envelope into which the medium is packed will accommodate.

The filter media packets that were used in the course of gathering the experimental data indicated below were hand filled, i.e., a filter medium envelope 86 filled with filter medium 88 was inserted between the two grates, and the two grates were squeezed together by hand and then bound by tape. (Filter medium envelope 86, filter medium 88 and grates 82, 84 as fully assembled in the manner just described, or also as described below, constitute a "filter media packet," the plural "media" being used since both filter medium envelope 86 and filter medium 88 constitute filter media in the generic sense. A particular "filter medium 88" may include a mixture of substances as was previously indicated, but nevertheless the singular term "medium" is used and is intended to refer to the content as a whole that is placed within filter medium envelope 86.) Subsequent to the time at which those embodiments were so hand made, and through use of which the experimental data reported herein were collected, it has been learned that holding the two grates together can be better accomplished using the elongate U-shaped sliders 90. Sliders 90 are preferably formed of black molded rubber or a similar such material, with sliders 90 further having a metal core, the rubber or like material then coming into contact with separator plates 66 when filter media packets 70–76 are placed therebetween as shown in FIG. 4, thereby to help ensure air-tightness so as to cause all incoming air to pass through each of the filter media packets. In lieu of that construction of sliders 90, appropriately shaped gaskets may also be employed.

In constructing a filter medium packet, as shown in FIG. 5, first filter grate 82 is seen to be bounded on all four sides by walls 92. Filter medium envelope 86 is placed within walls 92 (that space being termed a "filter medium container"), second filter grate 84 is placed atop filter medium envelope 86 in contact with walls 92 and physically held together, while sliders 90 are placed over the juncture between second filter grate 84 and walls 92 so as to hold first and second filter grates 82, 84 together. Supplemental sliders 90 shown in phantom in FIG. 5 may be added to the top and bottom of the resultant filter packet to aid further in providing airtight integrity of the filter packet within air conduit 54. As will be known to a person of ordinary skill in the art, second filter grate 84 could instead be formed with walls in the same manner as is first filter grate 82, the dimensions of such a grate being made either smaller than those of first grate 82, so that the walls of this alternative grate fit tightly within walls 92, or larger, so that the exterior sides of walls 92 fit within the walls of this alternative type of grate. (Of these two size alternatives, the latter would be preferred in that this new type of grate could be placed about the exterior of first filter grate 82 and its contained filter medium envelope 86 without disturbing the placement and tight packing of filter medium envelope 86 that will already have been carried out within the filter medium space of first filter grate 82.)

Another particular advantage of the indicated structure of the filter media packets is that no sealants or adhesives that might outgas VOC are used. Moreover, the filter media packets are recyclable in that most of the different filter media 88 can be removed and processed by heating or the like to remove therefrom all sorbed pollutants and then returned to use, and grates 82, 84 and sliders 90 can also be reused.

The preferred construction of air purifier 10 comprises the specific sequencing of filter media packets as previously noted and shown in FIG. 4. As best understood, when vehicle cabin air enters air purifier 10, dessicant-sorbent packet 70 acts to reduce the humidity of the incoming air and thereby to protect the effectiveness of carbon particle packet 72 and catalyst packet 74. Desiccant-sorbent packet 70 preferably contains 50% silica gel and 50% zeolite. The silica gel was obtained from Silica Gel Desiccant Products Company and the zeolite was Zeochem® 24-01, 4×8, type 4A. Carbon particle packet 72 may contain packed coal based activated carbon pellets to adsorb ozone along with many other gases including sulfur oxides, the particular type of coal-based carbon used being pelletized type G352-60 made by the PICA company (France). Acidic gases such as sulfur oxides, which contaminate the air, may also contaminate the catalyst, so for effective operation of the catalyst those pollutants are preferably to be removed from the air before that air reaches catalyst packet 74. The activated carbon so employed in carbon particle packet 72 may also contain impregnates to act as chemisorbents.

Catalyst packet 74 contains catalysts, specifically including a base metal catalyst that is somewhat moisture tolerant and effective at ambient air temperatures to break down carbon monoxide, and the CARULITE® 300 12×20 mesh catalyst made by the Carus Chemical Company was used for this purpose because of its applicability to carbon monoxide oxidation. Coconut based carbon packet 76, which follows catalyst packet 74, is intended to sorb benzene and other hydrocarbons, and contains coconut-based, activated carbon granules and/or beads necessary to adsorb the smaller hydrocarbon molecules, for which 50% PICA Nacar P-20×50 and 50% PICA G55-C were used.

HEPA filter 78 was the HEPA PLEAT II®, a 6.35 cm (2.5") deep pleated, high efficiency particulate filter, rated at 30.48 m/min (100 ft/min) and having an FPD (Filter Pressure Drop) of 0.53 W.G. (Water Gauge), mounted in an aluminum frame, which has been tested to remove 99.97% of particles measuring 0.3 microns in diameter, and being generally more efficient for both the smaller and larger particles. Carbon impregnated filter 80 uses a carbon impregnated fiber ("CIF"), for which coconut carbon wrap from Hepworth was used, and serves to capture residual gases and odors. Carbon impregnated filter 80 is formed simply by loosely folding the indicated fiber and taping the resultant folds of fiber together, and is thus distinct in structure from the filter media packets previously discussed (and of course from the HEPA filter).

Figure 6:
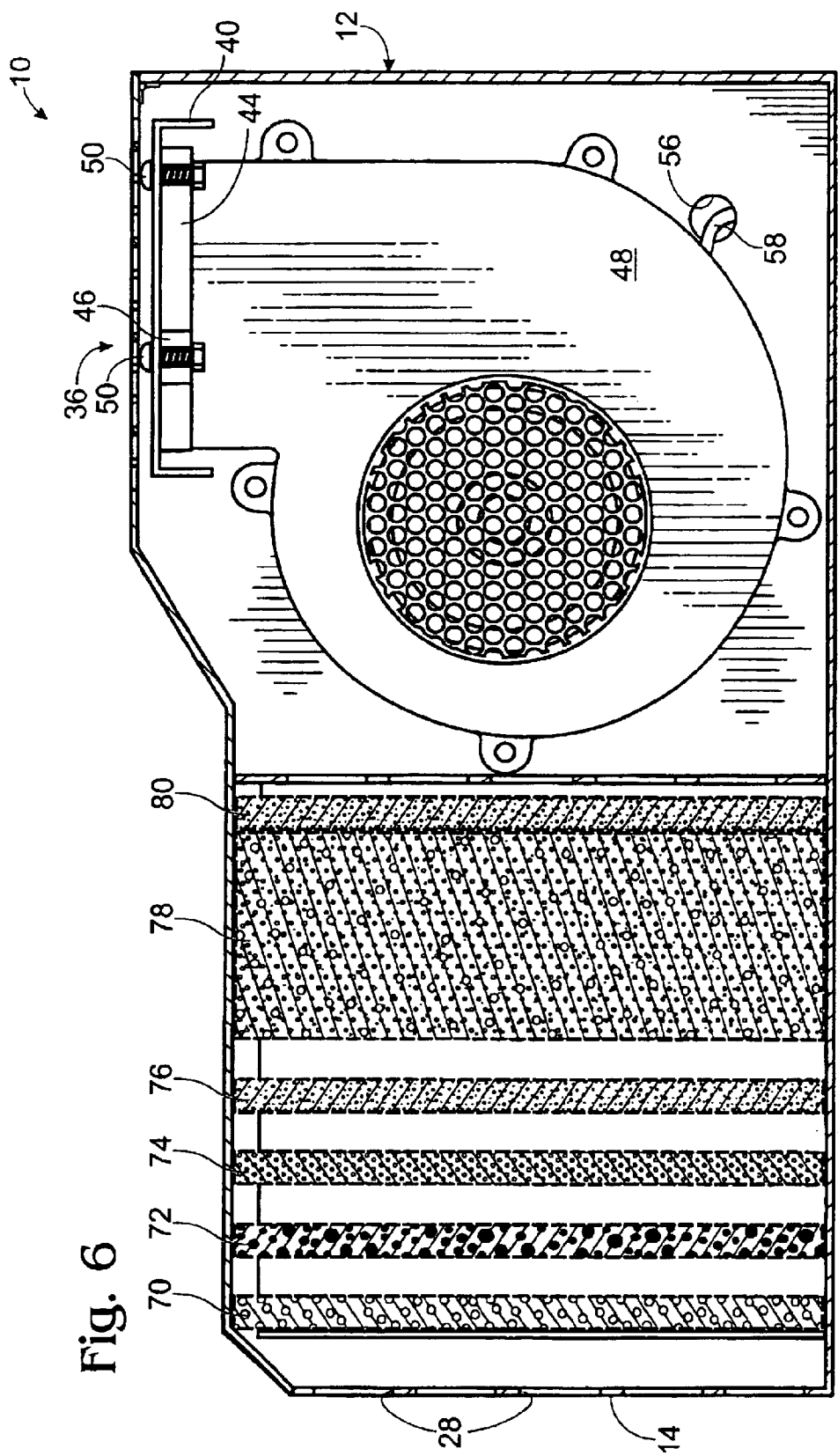
FIG. 6 is a longitudinal cross-sectional view in side elevation of the closed air purifier, taken along the lines 6—6' of FIG. 1.

For purposes of completeness in the drawings, FIG. 6 is a longitudinal cross-sectional view in side elevation of closed air purifier 10, taken along the lines 6–6' of FIG. 1, and showing the manner of connection of blower mounting frame 44 to sieve plate 40 using bolts/nuts 50 in a conventional manner. A gasket (not shown) can also be placed between blower mounting frame 44 and sieve plate 40 to help ensure air tightness and reduce noise.

FIG. 7 shows air purifier 10 including an upholstered cover 94 as installed in a motor vehicle with power source 58–62 ready to be connected to the vehicle cigarette lighter connector. Upholstery cover 94 protects passengers from the hard metal edges of air purifier 10, and the soft surface makes a comfortable console. Upholstery cover 94 is constructed so as to cover firmly the top, back, two sides, and bottom of air purifier 10, and is secured in place using Velcro® strips (not shown). Cloth loops 96, of which only one is shown in FIG. 7, may be sewn to each side of upholstery cover 94 in lieu of belt holder 52, as a means to secure air purifier 10 to a vehicle seat with a seat belt. As an alternative, upholstery cover 94 may be provided with slots in lieu of cloth loops 96, whereby belt holders 52 would pass therethrough to be used as noted earlier.

Also illustrated in FIG. 7 is an air exit flap 98, shown in solid when air purifier 10 is not in use, and shown in outline when air purifier 10 is in use such that air is exiting therefrom. Air exit flap 98 connects to upholstery cover 94 to the frontward side of air purifier 10, so that the exiting air is directed upwardly and back towards the rear of the vehicle cabin, thereby not to impinge directly on the passengers. Through practice, it will be learned at what angle air exit flap 98 should extend upwardly when air purifier 10 is working at its optimum, so that observation of a lower rising air exit flap 98 and thus a lesser flow of air would provide notice that such operation was not optimum, e.g., filter packets have become clogged or the like, and some maintenance or replacement would be required. Air exit flap 98 also serves to lessen the noise detected in the vehicle cabin when air purifier 10 is in operation.

FIG. 8 shows an alternative embodiment of air purifier 10 as installed in the trunk of an automobile, the figure for convenience also showing the locations within the vehicle at which the test instruments were located for conducting the air purity measurements that will be discussed below. In particular, FIG. 8 shows air purifier 10 installed within trunk region 100 of vehicle 102, such that air duct 104 connects in an airtight fashion to air exit hole 36 of air purifier 10 by any convenient well known means. Air duct 104 undergoes such bends as are necessary to bring it past a side of air purifier 10, towards the center line thereof where another bend directs a terminal end of air duct 104 forward into the rear seat area of the vehicle cabin, and having at that terminal end of air duct 104 an air outlet 106 as best seen in FIG. 9. Air inlet extension 108 extends from the back seat region of vehicle 102 downwardly into trunk region 100, whereby unpurified air can enter therein through air opening 110 as shown by incoming air arrow 112, and air inlet extension 108 is connected at its distal end in an airtight fashion to front panel 14 of air purifier 10 by any convenient means.

It can be seen in FIGS. 8, 9 that the particular embodiment being described has been adapted for use in those vehicle models that have a gap in the back of the rear seat that leads into the trunk region, that gap being provided to allow the carrying of long objects such as skis within the vehicle. For vehicles not so constructed, different routes for incoming and outgoing air with respect to an air purifier 10 located within the trunk would need to be used, which might be done using an air inlet and outlet disposed beneath the rear seat of the vehicle and ducted therefrom into the trunk region, an air inlet could be placed within the headliner of the vehicle and ducted therefrom to the trunk, or various other such configurations could easily be developed by a person of ordinary skill in the art from the present disclosure, and all such variations are deemed to fall within the scope of the present invention It should be emphasized that all such ducting materials should be of a type that does not itself "outgas" volatile organic compounds (VOC) and insert odorous chemicals into the air passing therethrough, that kind of outgassing often being found from ducts made of soft, flexible plastic-like materials disposed around a metal coil. For that reason, an odor-free hard plastic material of the type often used for sewer pipe was used for the material of air duct 104, although there may be other like materials that would serve as well, and these would likewise fall within the scope of the invention.

FIG. 9 shows in cutaway the construction of that portion of the air purifier 10 embodiment of FIG. 8 that is disposed within the rear seat area of vehicle 102, wherein is also shown a console 114 formed of a semi-rigid plastic foam, within which is disposed a terminal portion of air duct 104 leading to air outlet 106, and above which is disposed air opening 110. Preferably, console 114 will include a spongy cushion 116 having a rounded surface, and preferably also side pouches 118 (of which only one is shown in FIG. 9) as well as cup holders 120 disposed atop console 114, perhaps attached by a Velcro® flap (not shown) or similar means, again for the convenience of the rear seat passengers. Preferably, console 114 will also have upholstery 122, as does the embodiment of air purifier 10 shown in FIG. 7, so that console 114 will match or blend in aesthetically with the vehicle cabin interior. (Of course, the embodiment of air purifier 10 in FIG. 7 may similarly have side pouches and cup holders.) Console 114 includes an air flap 124 disposed over air outlet 106 for the same purposes as those of air exit flap 98. That is, air flap 124 serves to soften the noise, to indicate air flow strength, and is rotatably connected above air outlet 106 so as to direct the purified air downward.

Experimental Data

The experimental data that establish the performance of air purifier device 10 in its several prototype embodiments will now be shown and described. In order to evaluate the utility and efficacy of the air purifier in its several embodiments, available U.S. or foreign ambient air quality standards were identified as "targets" that it was hoped the air purifier would meet, a procedure that so far as Applicant knows has not been carried out in the previous art. As shown by the results below, the quality of the air tested as it exited air purifier 10 either met, or typically far exceeded, the relevant ambient air quality standards. These results seem to be particularly important with respect to the more toxic and indeed lethal pollutants such as the toxic hydrocarbons (particularly benzene) and the "criteria" pollutant lead. All data were collected inside a moving vehicle, passing through the crowded downtown streets or freeways of the several cities cited, and, as indicated on the several figures, data (or air) collection was carried out both with air purifier 10 turned off and turned on, and the lesser concentrations of the various pollutants upon turning on air purifier 10 are shown.

All data except those for hydrocarbons were taken using a standard 5-passenger sedan while carrying two or three persons; the air collection procedures used for the hydrocarbon analyses were taken from within a larger SUV while carrying four persons. In the course of using each such vehicle to gather the experimental data, the HVAC system of the vehicle itself was typically in full operation. These HVAC systems are said to include what are variously termed "cabin air filters," "pollen filters," "micron filters," or "air conditioning filters," these being advertised as means for capturing dust and pollen. However, the data collected when air purifier 10 was not in use typically showed levels of pollution, including that of fine particulate matter, often far in excess of the relevant standards.

Before describing the actual experimental results, there is now given in more detail the conditions under which air samples were either tested in situ or collected for later analysis, which types of instruments were used, and which embodiment of air purifier 10 was used in what location. The several embodiments of air purifier 10 differ principally in the power of blower 48, different ones of which were rated at 5 m$^3$/min (176 CFM), 6 m$^3$/min (211 CFM), and 7 m$^3$/min (250 CFM), and in each case which blower was used in connection with each test or sample collection will be noted. FIG. 8 shows the several positions A, B, and C within the cabin of vehicle 102 at which the sensing portion of particular instruments were located in testing or collecting the air. All of positions A, B, and C center on the location of a seated passenger off to one side of air purifier 10 or console 114 and hence to one side of the air exiting therefrom, so that, presumably, the air being measured would have passed at least to the front of the cabin and then back again, so as to get a better sampling of the cabin air as a whole than would have been accomplished with the test instrument in line with the air outlet of either air purifier 10 or console 114. The volume rate of the air exiting from air purifier 10 was not determined in all cases, but using the TSI VelociCheck™ anemometer and the cross-sectional area of air outlet 86 at its terminus, it was determined that with a 7 m$^3$/min (250 CFM) embodiment of air purifier 10 located in the vehicle trunk, the rate of air flow at outlet 106 was about 2.12 m$^3$/min (75 CFM), based upon a diameter of air outlet 86 of 3 inches (7.62 cm; area=45.6 cm$^2$), and the measured air speed of 7.62 m/sec (1500 ft/min). From the ratios of the area of air outlet 86 to that of front plate 14 (neglecting the space therein not occupied by holes 28) of 20.32 cm×25.4 cm=516 cm$^2$, the speed of the air entering into purifier 10 (i.e., $V_f$) can be approximated at about 45.6/516 (1500 ft/min)=133 ft/min=0.67 m/sec.

Similar measurements of the air input speed on the 7 m$^3$/min (250 CFM) embodiment as located in the trunk varied widely and were quite sensitive to the precise location of the anemometer sensor, values ranging from 80 ft/min in the center of air opening 110 to around 400 ft/min near the top thereof, which is reasonably consistent with the calculated value just indicated. (Air inlet extension 108 extends downwardly to front plate 14 of air purifier 10 as disposed in the vehicle trunk, which could account for the air speed being higher near the top of air opening 110 (i.e., the opening to air inlet extension 108) than near the center thereof.) The 6 m$^3$/min (211 CFM) embodiment of air purifier 10 as located on the vehicle rear seat was measured by the TSI VelociCheck™ anemometer to operate at an air input speed of about 0.25 m/sec (50 ft/min).

Measurements of the air output speed of the 7 m$^3$/min (250 CFM) embodiment located within the trunk, carried out on Feb. 6, 2001, indicated a speed of 6.1 m/sec (ft/min) on a "low" speed setting and 8.1 m/sec (1600 ft/min) on a "high" speed setting. Measurements of the air output speed of the 6 m$^3$/min (211 CFM) embodiment located on a vehicle rear seat, also carried out on Feb. 6, 2001, were more difficult in that in this embodiment air exit hole 36 has a louver for "pointing" the direction of the emerging air, and the measured air speeds varied substantially depending upon the precise location of the sensing probe. For the high speed operation, the measurements ranged from 1.0 m/sec (200 ft/min) to 7.6 m/sec (1500 ft/min), from which a composite and rather subjective average of 4.6 m/sec (900 ft/min) was estimated. For the low speed operation, the values ranged from 1.0 m/sec (200 ft/min) to 6.1 m/sec (1200 ft/min), yielding a similarly estimated average of 3.8 m/sec (750 ft/min).

The descriptions of these tests that follow will identify the instrument employed for each particular measurement or collection, and at which of the three A, B, or C locations the test or collection was made. The term "PM-10" refers to particles 10 micrometers or less in diameter, and "PM-2.5" refers to particles 2.5 micrometers or less in diameter.

The instruments used were as follows:
1. Dräger CMS (Chip Measuring System) Gas Analyzer, wherein the relevant "chip" for each particular chemical species was employed.
2. Ozone Spot Checker.
3. MIE DataRAM™ Aerosol Monitor (portable and real time).

The analytical methods used, in the case of post sample-collection analysis, were:
1. EPA Method TO-14A. (Description of the method is available in PDF format at the web site http://www.epa.gov/ttn/amtic/files/ambient/airtox/to-14ar.pdf (visited on Jan. 29, 2001).
2. NIOSH Method 6014. (Description of the method is available in PDF format at the web site http://www.cdc.gov/niosh/pdfs/6014-1.pdf (visited on Jan. 29, 2001).
3. OSHA Method ID-200. (Description of the method is available in HTML format at the web site http://www.osha-slc.gov/dts/sltc/methods/inorganic/id200/id200.html (visited on Jan. 29, 2001).
4. OSHA Method ID-125. (Description of the method is available in HTML format at the web site http://www.osha-slc.gov/dts/sltc/methods/inorganic/id125g/id125g.html or at http://www.osha-slc.gov/dts/sltc/methods/inorganic/id125g/id125g.pdf or in PDF format (visited on Jan. 29, 2001).

We shall now describe the manner of obtaining each of the experimental results, and in some cases their particular significance. These field results are of course not "controlled," in the strict laboratory sense that comparisons could be made using different embodiments of air purifier 10 under identical conditions, or similar such experimental models—there was little if any control over the levels of pollution that would be encountered in driving through Bangkok, Thailand, Los Angeles, Calif., or Portland, Oreg., except that insofar as possible environments that would be most challenging to air purifier 10 were sought out. The data obtained are not particularly clear also, in the sense that substantial changes in the measured air particulate levels can be seen to occur during periods when air purifier 10 was turned off (especially notable in FIGS. 13 and 14), hence it is not possible to attribute every decrease in the pollutant level to the action of air purifier 10. What these data do show that controlled laboratory tests cannot, however, is that air purifier 10 is effective in providing "clean" air within a vehicle cabin as it is being driven on the streets, i.e., cabin air having pollution levels as to the targeted pollutants that are below the standards defined by the various government agencies. Of course that goal really is, or at least ought to be, the ultimate goal of the cabin air purification industry, and the data provided in the following figures show that it can be, and in fact has been, accomplished by the present invention.

Figure 10:
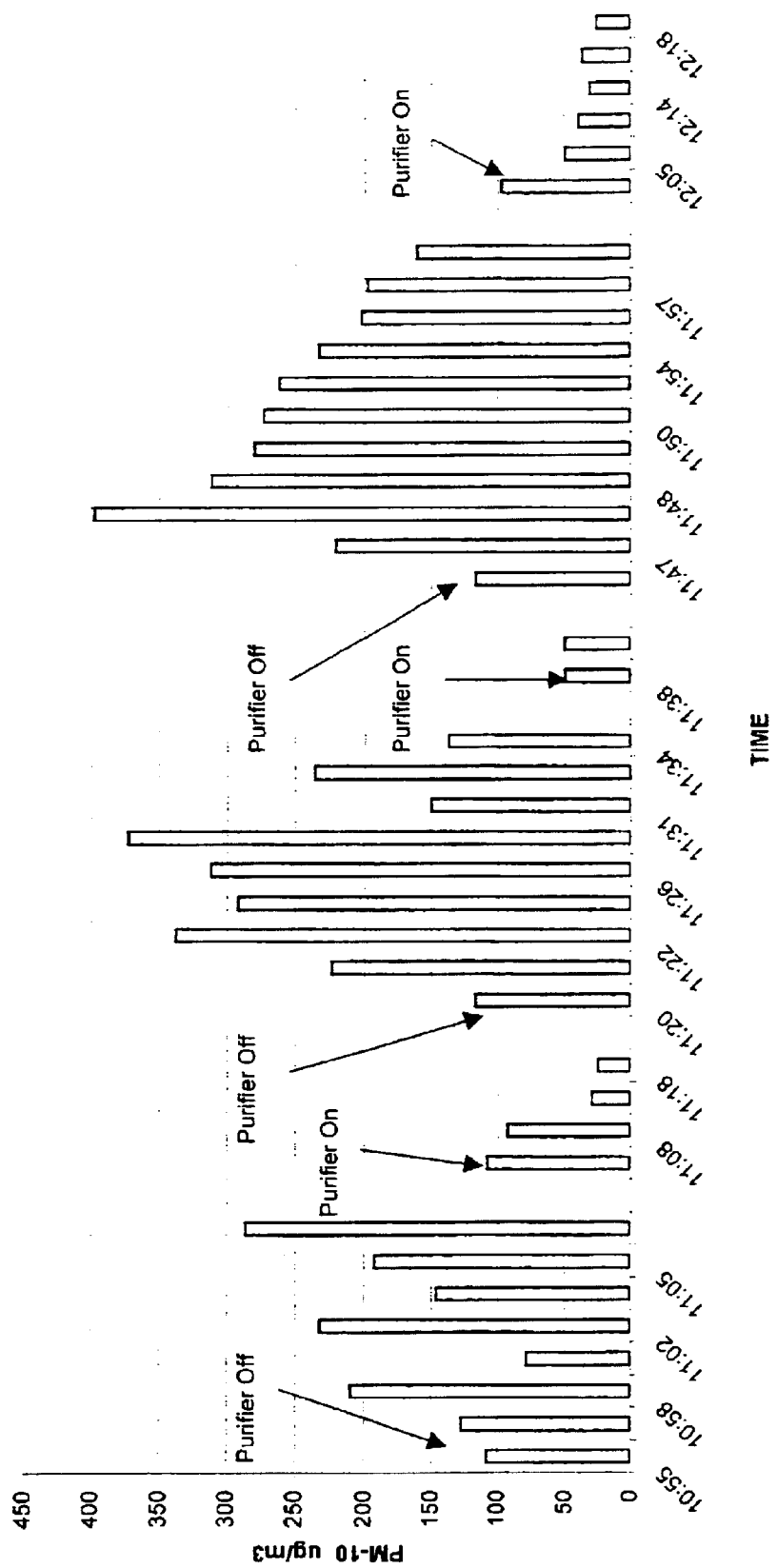
FIG. 10 is a bar graph representation of PM-10 air purity field tests carried out with the air purifier in Bangkok, Thailand, on Mar. 13, 2000.

FIG. 10 is a bar graph representation of PM-10 air purity field tests using a 7 m$^3$/min (250 CFM) embodiment of air purifier 10, as carried out in Bangkok, Thailand, on Mar. 13, 2000. The MIE DataRAM™ instrument was used, positioned in the B position of FIG. 8, which roughly corresponds to a person sitting on one side of the rear seat of the vehicle and holding the instrument such that the actual air collection point thereon is positioned in front of the person at waist level.

Figure 11:
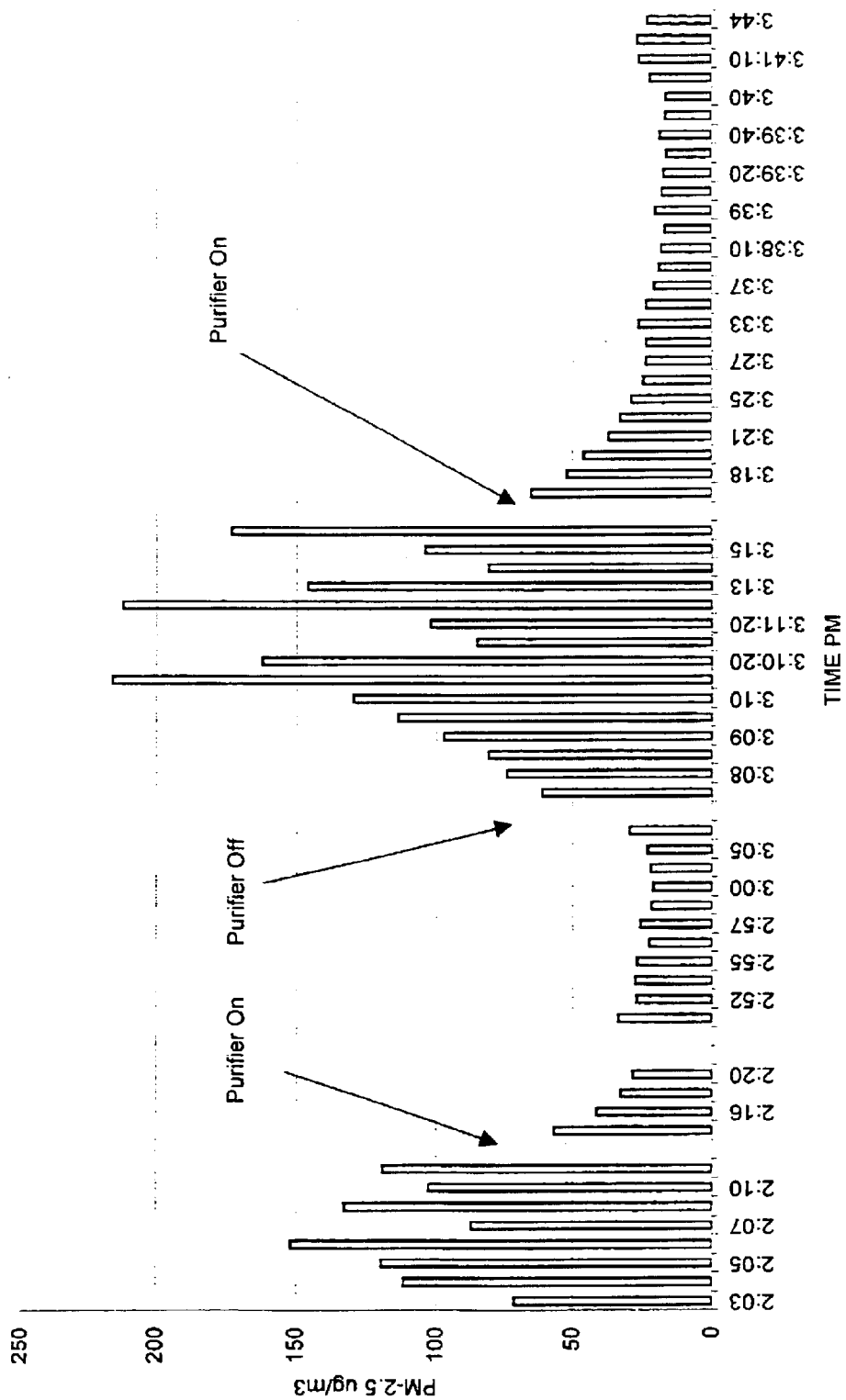
FIG. 11 is a bar graph representation of PM-2.5 testing in Bangkok, Thailand, on Mar. 13, 2000, using the same embodiment of the air purifier as in FIG. 10.

FIG. 11 is a bar graph representation of the results of PM-2.5 testing in Bangkok, Thailand, on Mar. 13, 2000, again using the 7 m$^3$/min (250 CFM) embodiment referred to in FIG. 10. The MIE DataRAM™ test instrument was again used, positioned in the A position of FIG. 8, which roughly corresponds to a person sitting to one side of the rear seat of the vehicle and holding the instrument such that the actual air collection point thereon is positioned in front of the person at eye level.

Figure 12:
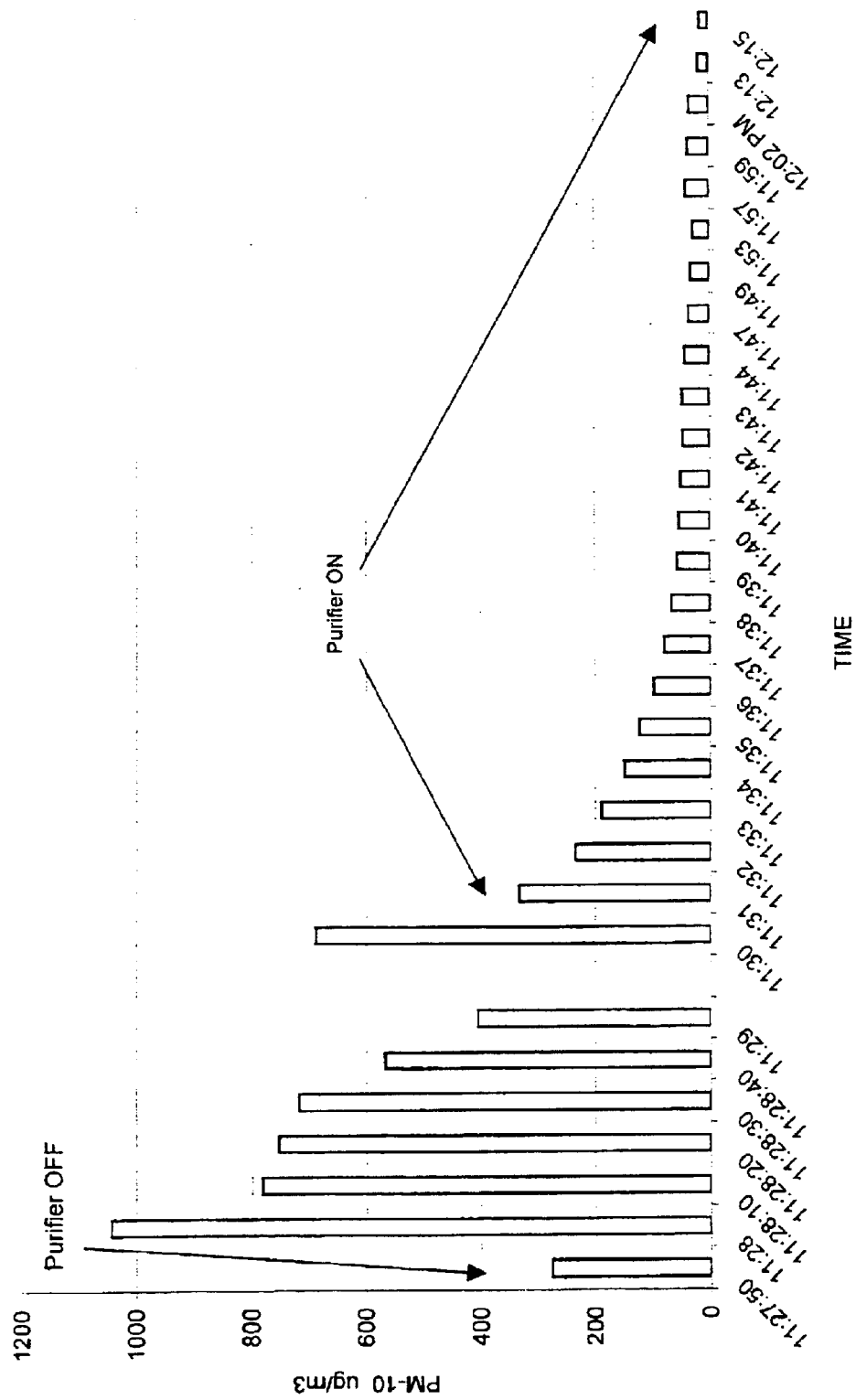
FIG. 12 is a bar graph representation of PM-10 test results acquired in Bangkok, Thailand, on Mar. 14, 2000, using a different embodiment of the air purifier from that of FIG. 11.

FIG. 12 is a bar graph representation similar to that of FIGS. 10–11, now showing PM-10 test results acquired in Bangkok, Thailand, on Mar. 14, 2000, but using a 5 m$^3$/min (176 CFM) embodiment of the device. The test instrument used was again the MIE DataRAM™, positioned in the A position of FIG. 8.

It may be noted that the PM-10 values shown in FIGS. 10 and 12 were taken under comparable conditions, i.e., in Bangkok, Thailand, around noon time on successive days in mid-March, except that the data of FIG. 10 were obtained using a 7 m$^3$/min (250 CFM) embodiment of air purifier 10 on Mar. 13, 2000, while those of FIG. 12 were obtained using a 5 m$^3$/min (176 CFM) embodiment on Mar. 14, 2000. As it happened, the ambient air pollution levels (i.e., those measured with air purifier 10 turned off) were quite a bit higher on Mar. 14, 2000, while using the lower powered embodiment, than those of Mar. 13, 2000, using the higher powered embodiment. What is instructive from a comparison of these two data graphs is that the lower powered embodiment, even when subjected to a rather greater challenge in terms of ambient air pollution, was fully able to provide a very low level of cabin air pollution.

Figure 13:
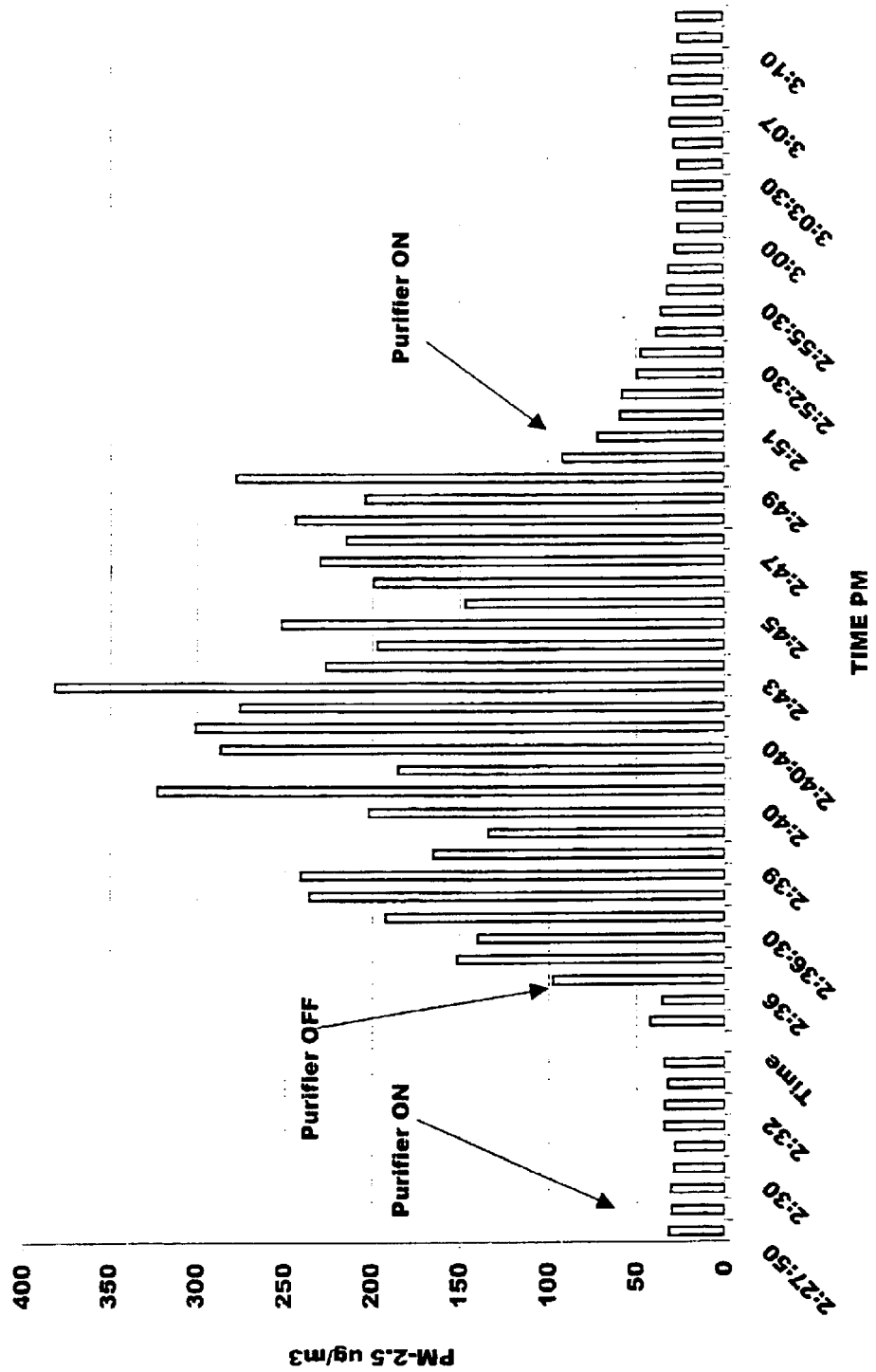
FIG. 13 is a bar graph representation of PM-2.5 test results from Bangkok, Thailand, on Mar. 14, 2000, using the same embodiment as that of FIG. 12.

FIG. 13 is a bar graph representation similar to that of FIGS. 10–12, now showing PM-2.5 test results from Bangkok, Thailand, on Mar. 14, 2000, again using a 5 m$^3$/min (176 CFM) embodiment of the device. The test instrument used was again the MIE DataRAM™, positioned in the C position of FIG. 8, which roughly corresponds to a person sitting in the front passenger seat of the vehicle and holding the instrument such that the actual air collection point thereon is positioned in front of the person at waist level.

Figure 14:
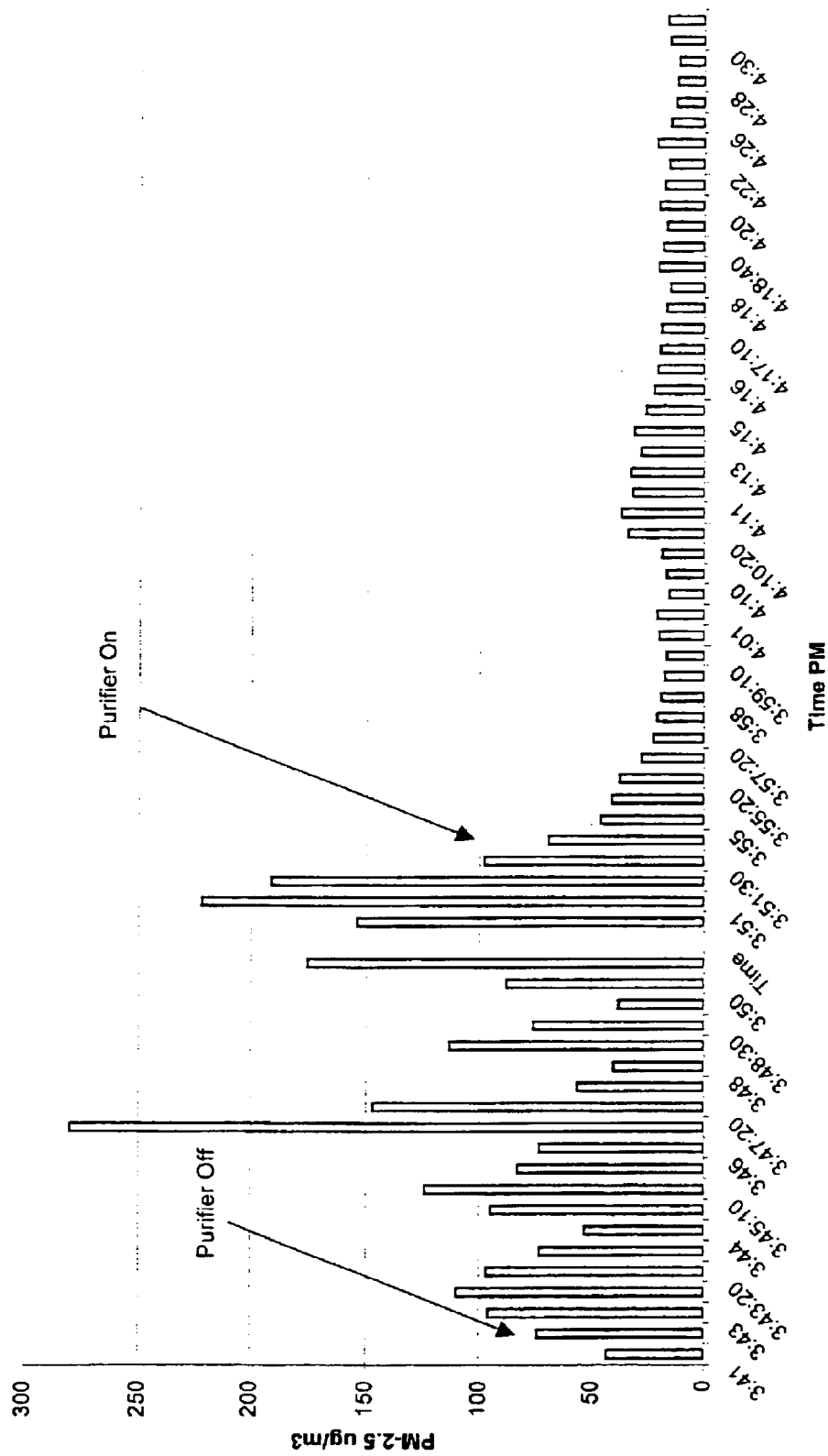
FIG. 14 is bar graph representation of a second set of PM-2.5 test results, like those of FIG. 13, carried out in Bangkok, Thailand, on Mar. 15, 2000.

FIG. 14 is bar graph representation of a second set of PM-2.5 test results using the same 5 m$^3$/min (176 CFM) embodiment as referred to in FIG. 13, carried out in Bangkok, Thailand, on Mar. 15, 2000. The test instrument used was the MIE DataRAM™, positioned in the C position of FIG. 8.

Figure 15:
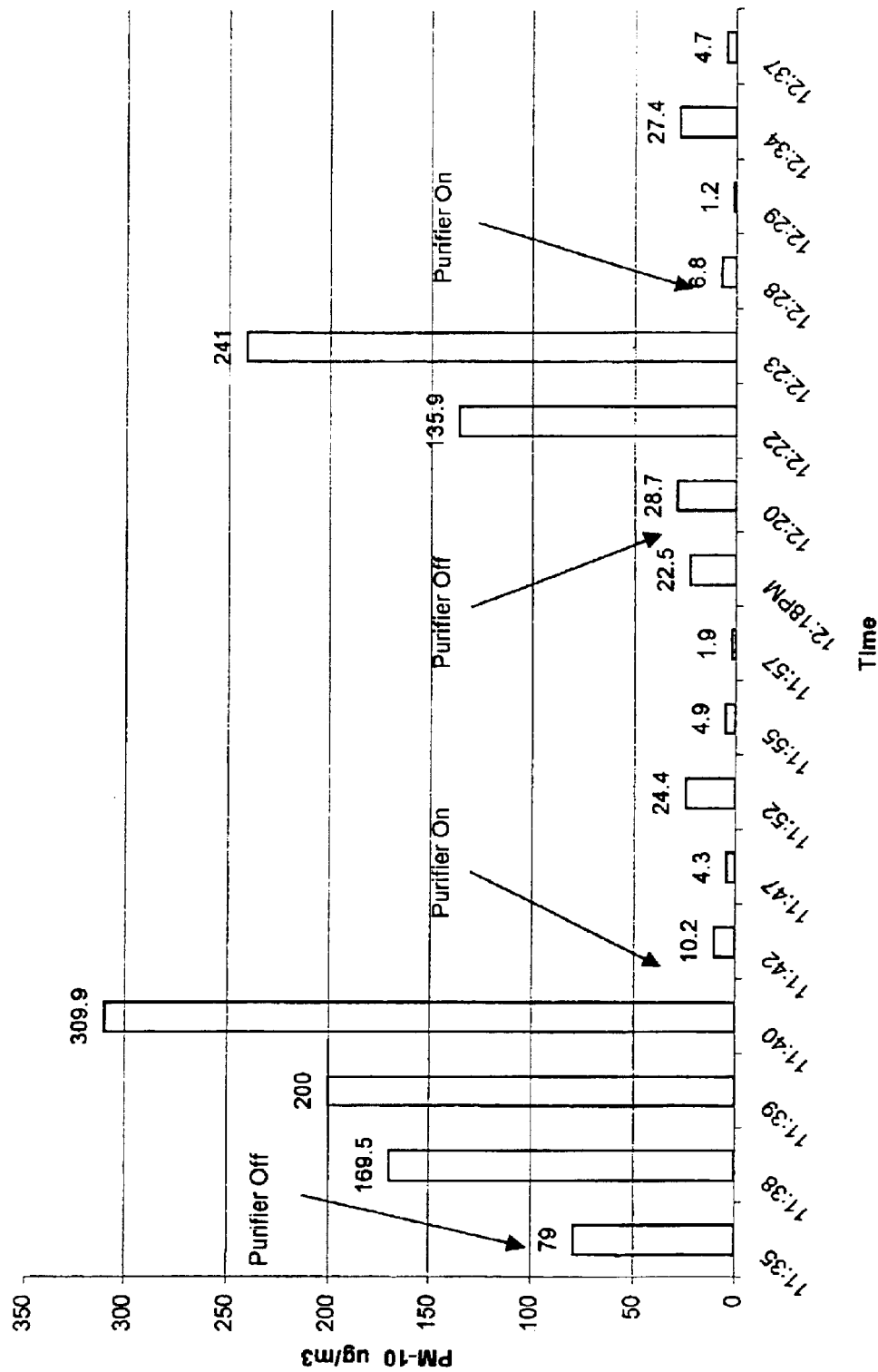
FIG. 15 is a bar graph representation of PM-10 tests using the embodiment of FIG. 10, carried out in Los Angeles, Calif., on Aug. 2, 1999, but wherein the air purifier was located in the vehicle trunk as shown in FIGS. 8–9.

FIG. 15 is a bar graph representation of PM-10 test results on the 7 m$^3$/min (250 CFM) embodiment of FIG. 10, carried out in Los Angeles, Calif., on Aug. 2, 1999, but wherein the air purifier device was located in the vehicle trunk as shown in FIGS. 8–9.

Figure 16:
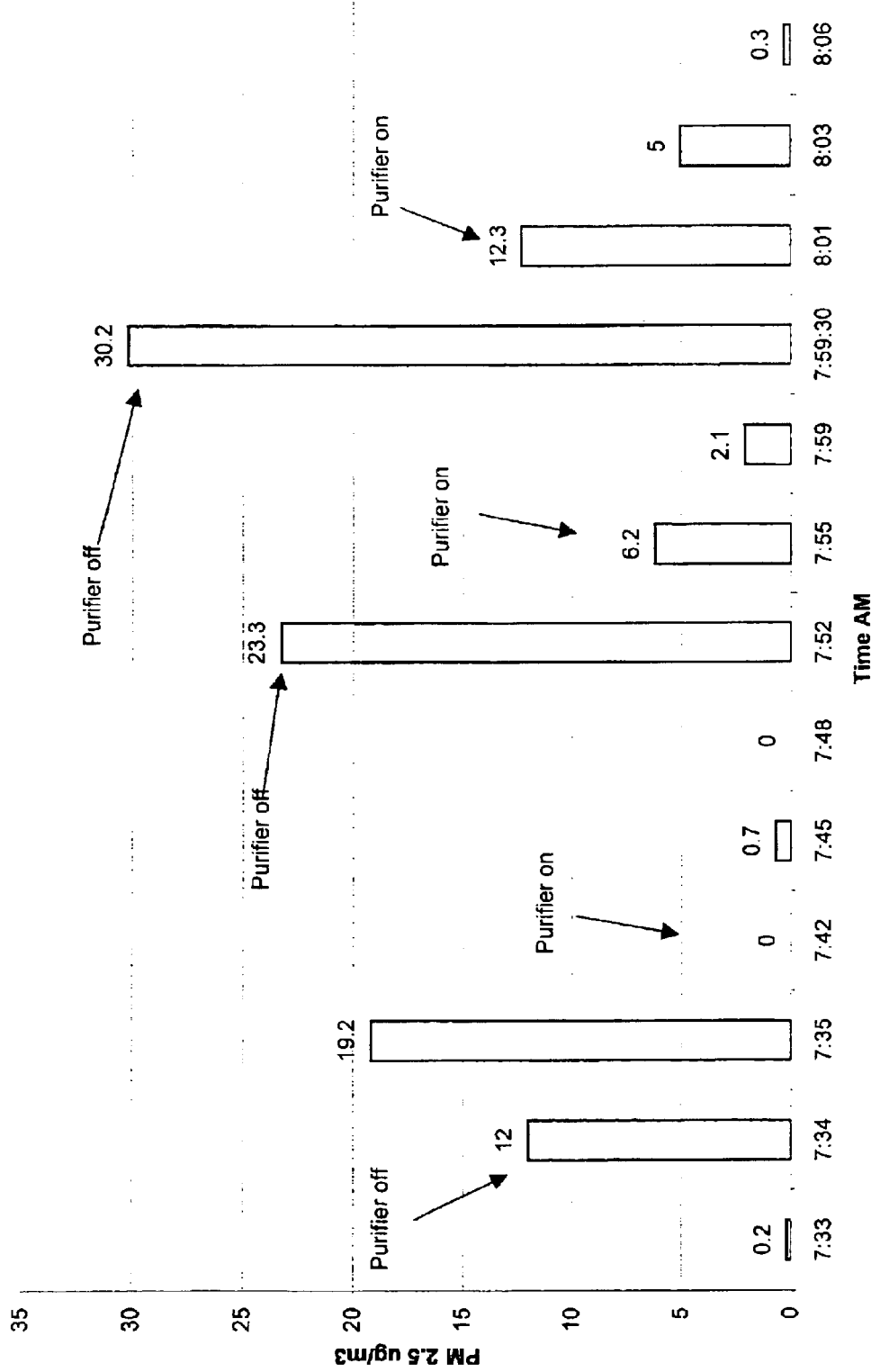
FIG. 16 is a bar graph representation of PM-2.5 tests carried out in Los Angeles, Calif., on Aug. 3, 1999, where again the air purifier was located in the vehicle trunk.

FIG. 16 is a bar graph representation of PM-2.5 test results using the 7 m$^3$/min (250 CFM) embodiment as referred to in FIG. 15, carried out in Los Angeles, Calif., on Aug. 3, 1999, where again the air purifier device was located in the vehicle trunk.

Figure 17:
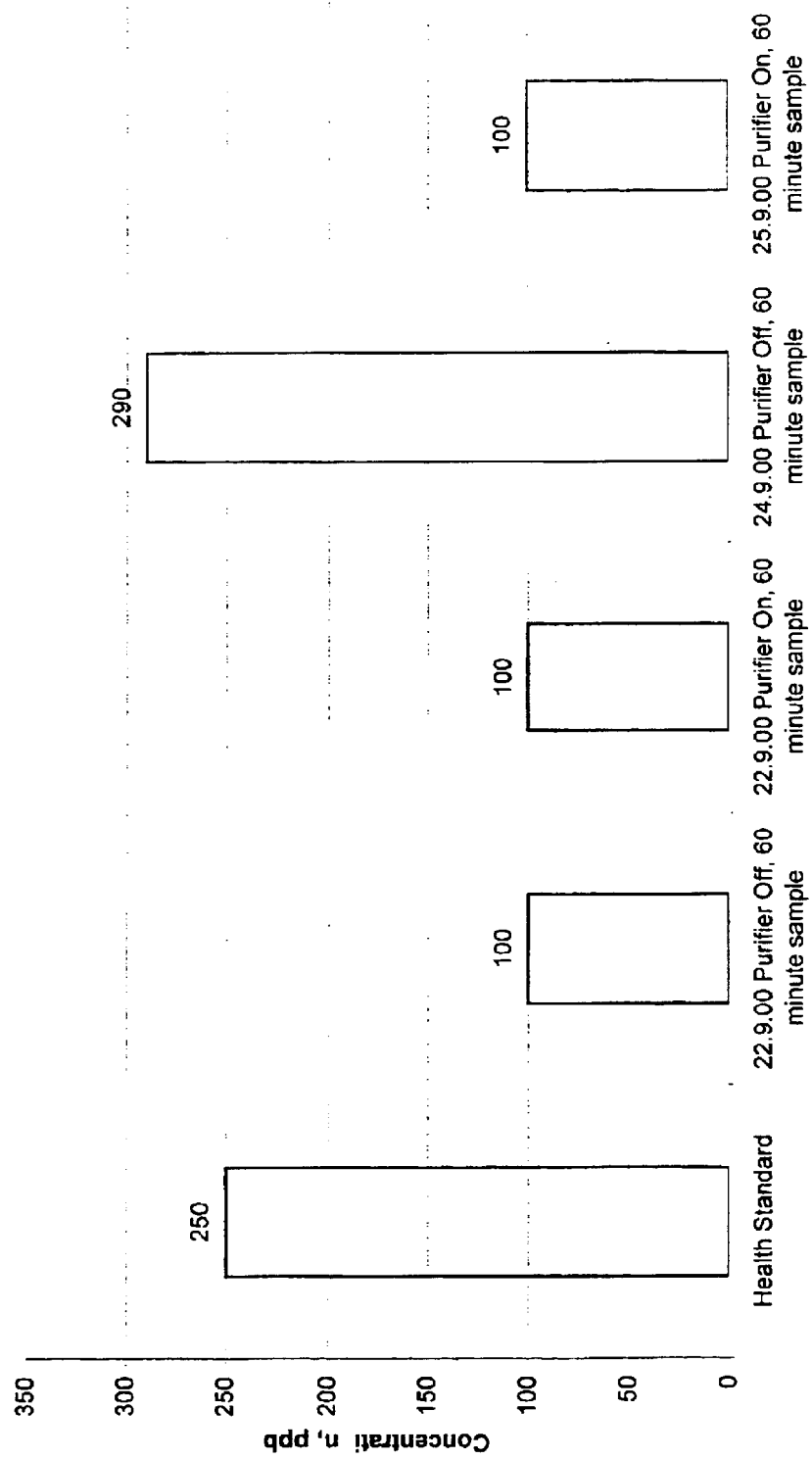
FIG. 17 is a bar graph representation of analyses for nitrogen dioxide ($NO_2$) using a 211 CFM embodiment of the air purifier, on cabin air samples taken Sep. 22–25, 2000, in Los Angeles, Calif., and Portland, Oreg., and later analyzed, and also showing the relevant health standard.

FIG. 17 is a bar graph representation of analyses for nitrogen dioxide ($NO_2$) using a 6 m$^3$/min (211 CFM) embodiment of the air purifier device, on cabin air samples taken Sep. 22–25, 2000, in Los Angeles, Calif., and Portland, Oreg., as analyzed by Assay Technology Labs, Pleasanton, Calif., using Method NIOSH 6014, and also showing on the chart the relevant health standard. The air sample was collected using a glass tube, positioned in the B position of FIG. 8.

Figure 18:
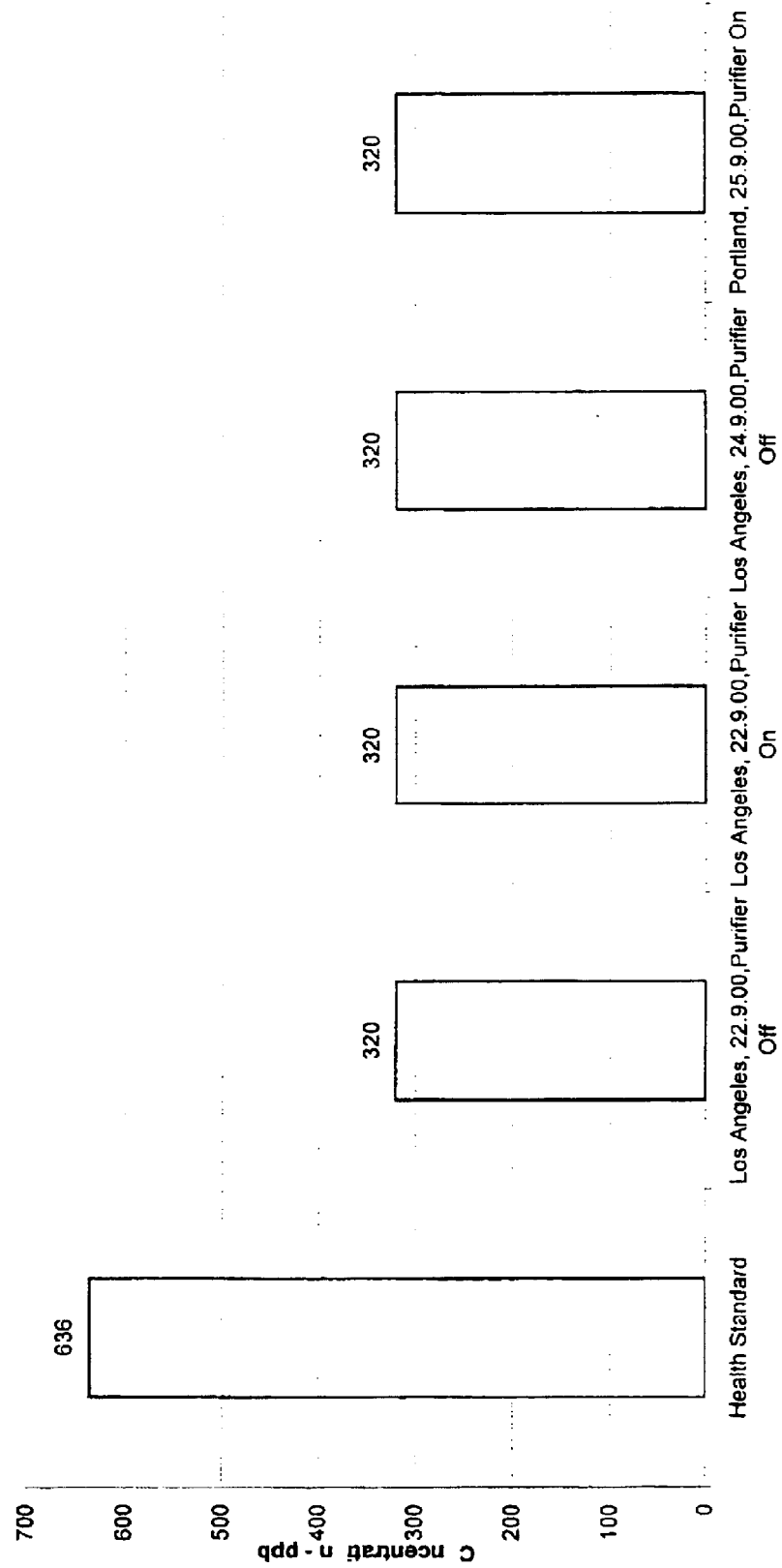
FIG. 18 is a bar graph representation of analyses taken and analyzed under the same conditions as were the data in FIG. 17, except with respect to sulfur dioxide ($SO_2$) and again showing the relevant health standard.

(The apparently equal values of these nitrogen dioxide concentrations, and likewise the sulfur dioxide concentrations of the following FIG. 18, are an artifact of the measurement process: those values were the minimum detectable values for the time period over which data were recorded. It was estimated that in order to reduce that minimum detectable value to a level at which distinctions between "purifier off" and "purifier on" could be drawn, it would have been necessary to drive the streets steadily for some four hours, which for the comfort of the experimenters would have been quite unbearable. These data are intended only to show that if the concentration in the air of the particular pollutant was not already below the health standard with the purifier off, then that concentration could be reduced to below that level with the purifier on.)

FIG. 18 is a bar graph representation of analyses taken and analyzed under the same conditions as were the data in FIG. 17, except now with respect to sulfur dioxide ($SO_2$) using Method OSHA ID 200, and again showing the relevant health standard. The air sample was again collected using a glass tube positioned in the B position of FIG. 8.

Figure 19:
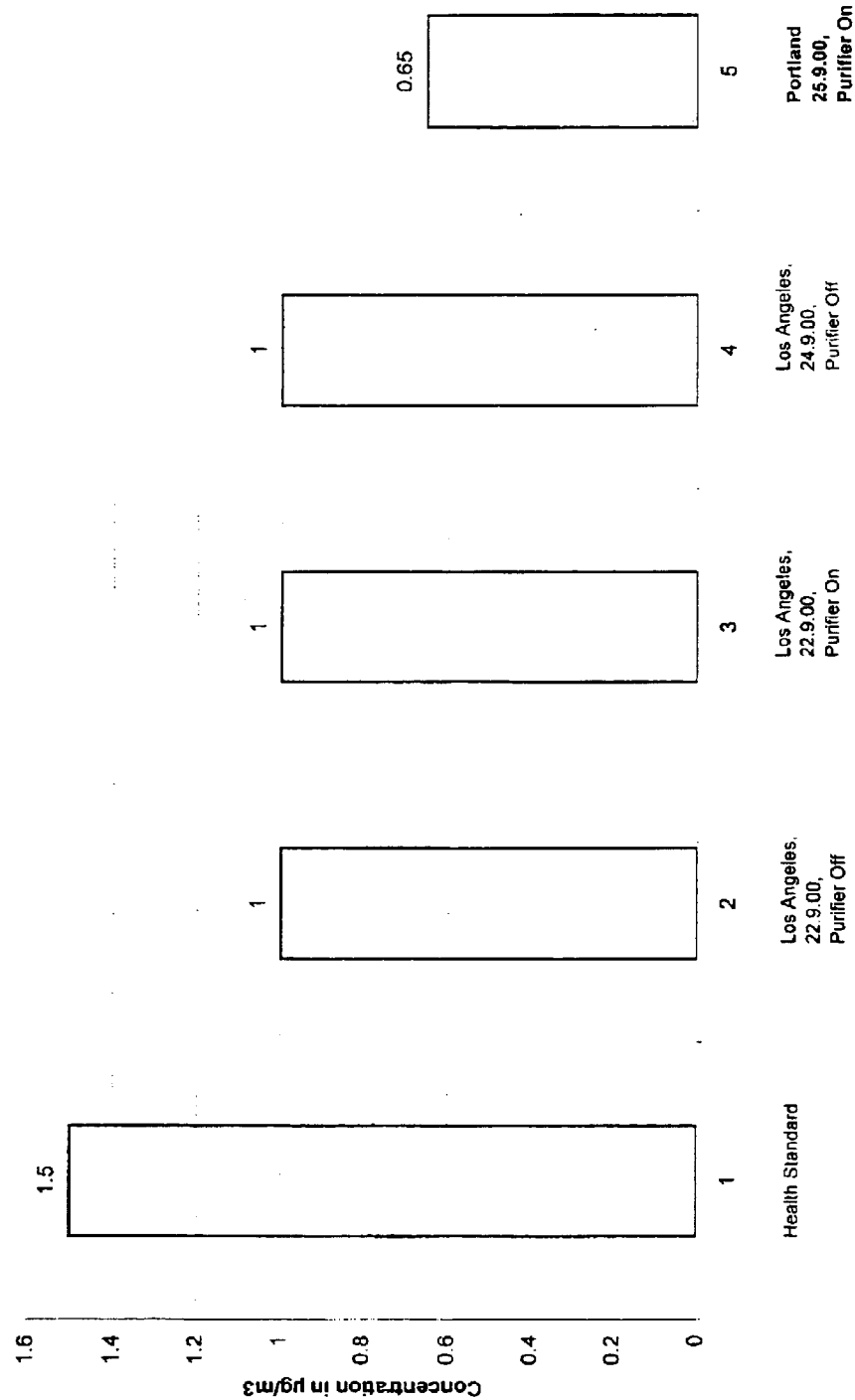
FIG. 19 shows data acquired as were those in FIGS. 17–18, but with respect to lead (Pb) and again showing the relevant health standard.

FIG. 19 shows data acquired as were those in FIGS. 17–18, but with respect to lead (Pb) using Method OSHA ID 125 and again showing the relevant health standard.

Figure 20:
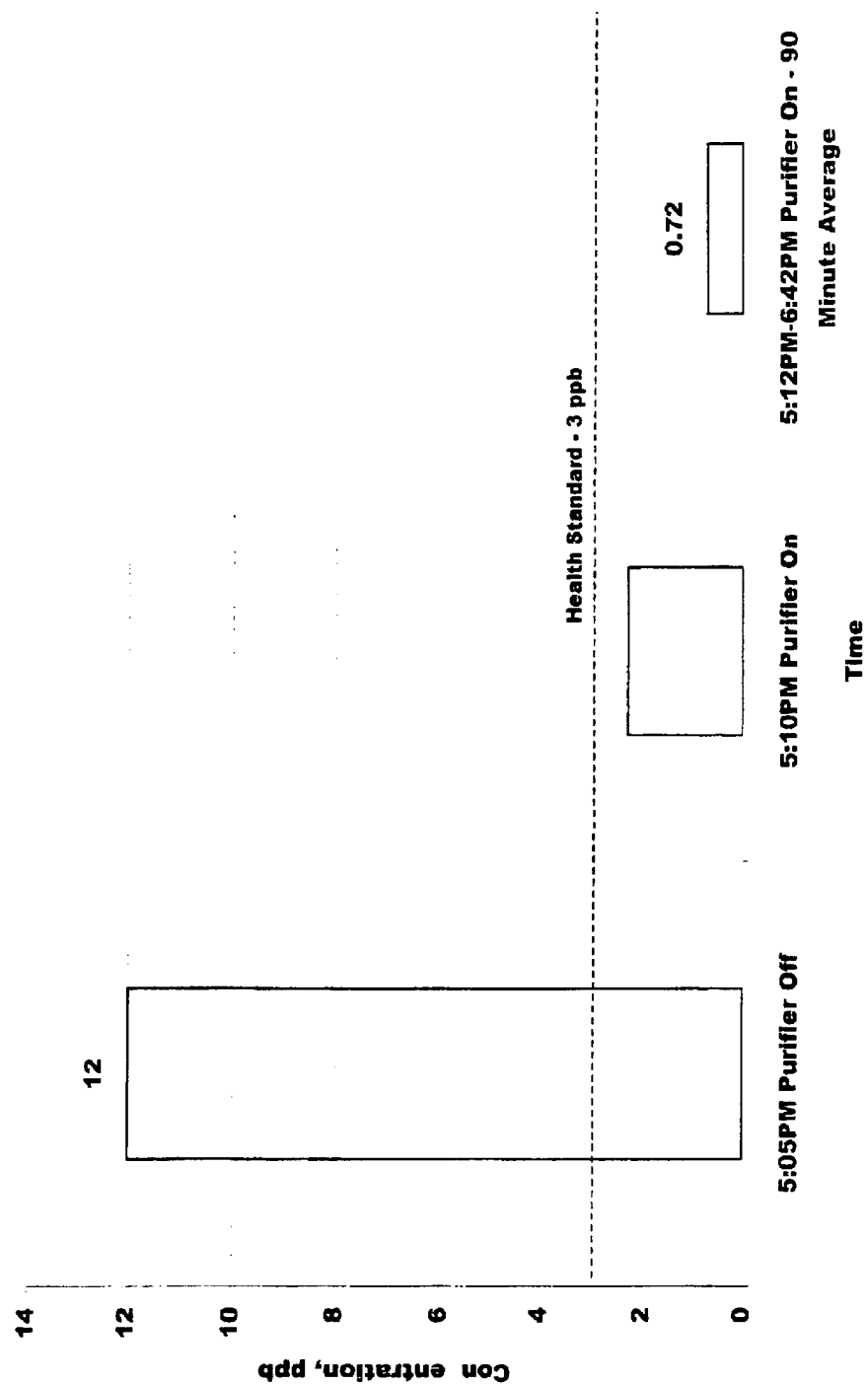
FIG. 20 is a bar graph representation of data with respect to benzene, acquired in Los Angeles, Calif. on Sep. 1, 2000, by Summa canister sampling.
Figure 21:
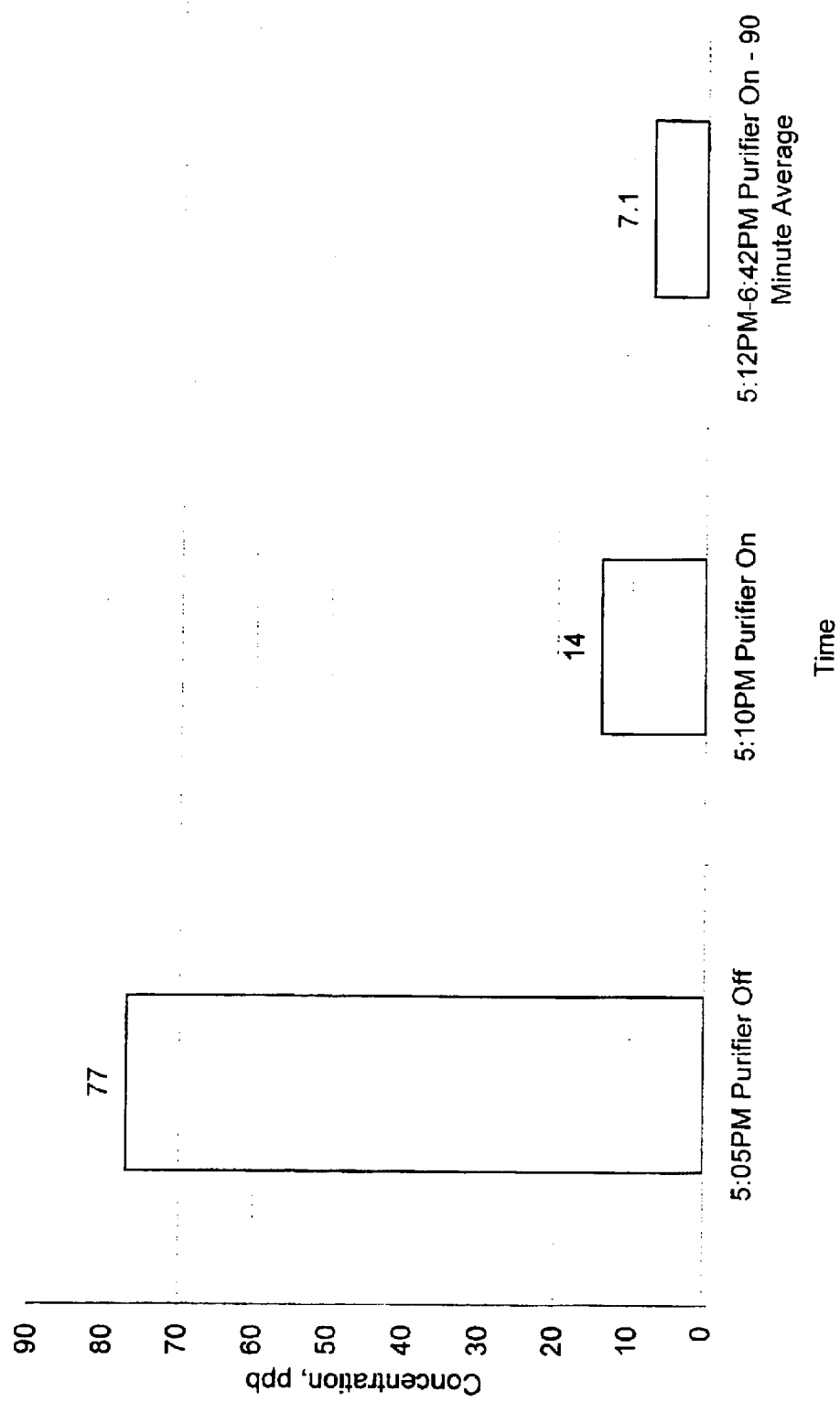
FIGS. 21–26 show analytical results from the samples of FIG. 20, analyzed at the same time and in the same manner, but as to the hydrocarbons toluene, ethylbenzene, and p-xylenes, o-xylene, 1,3-butadiene, and t-butylmethyl ether, respectively.
Figure 22:
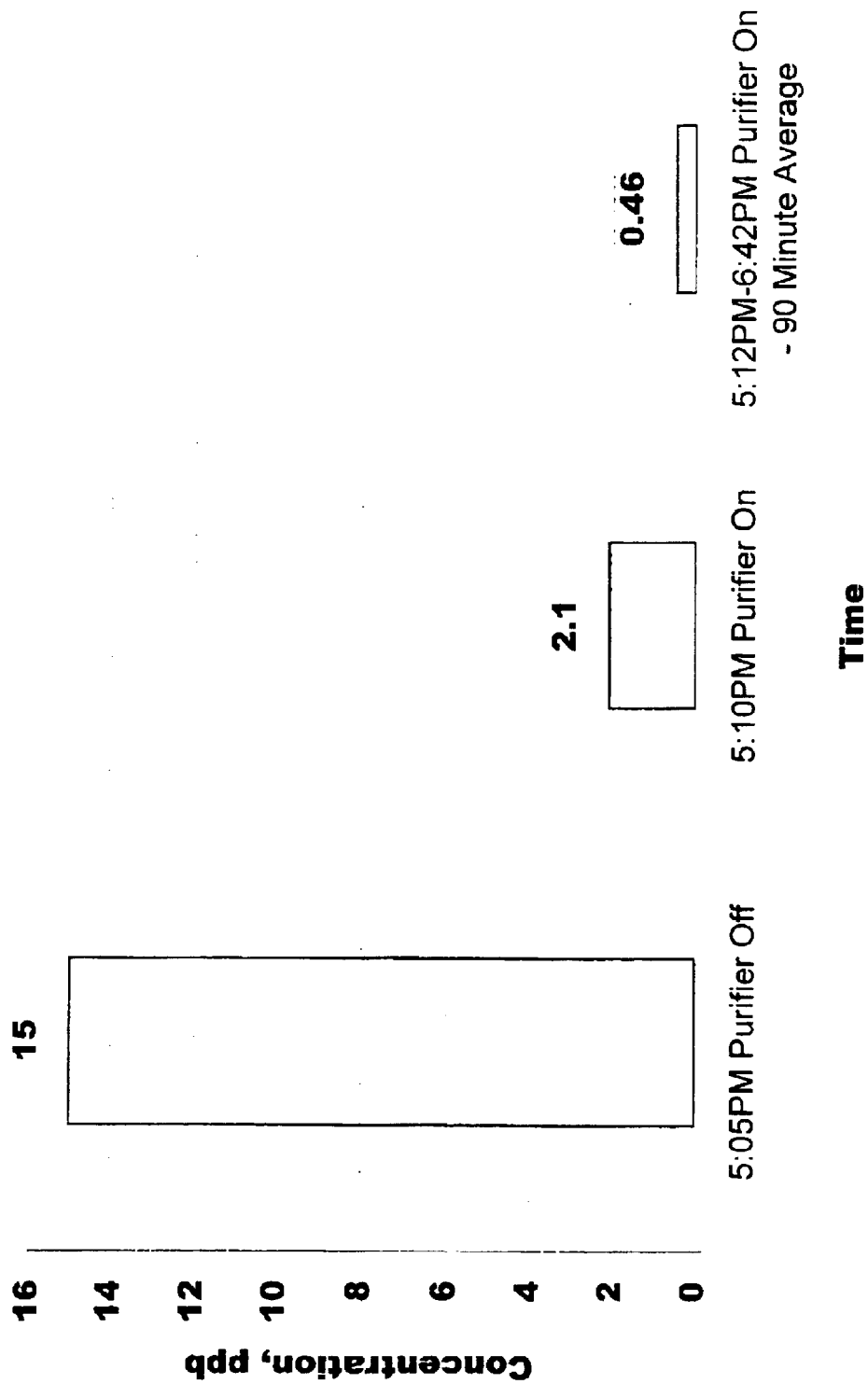
Figure 23:
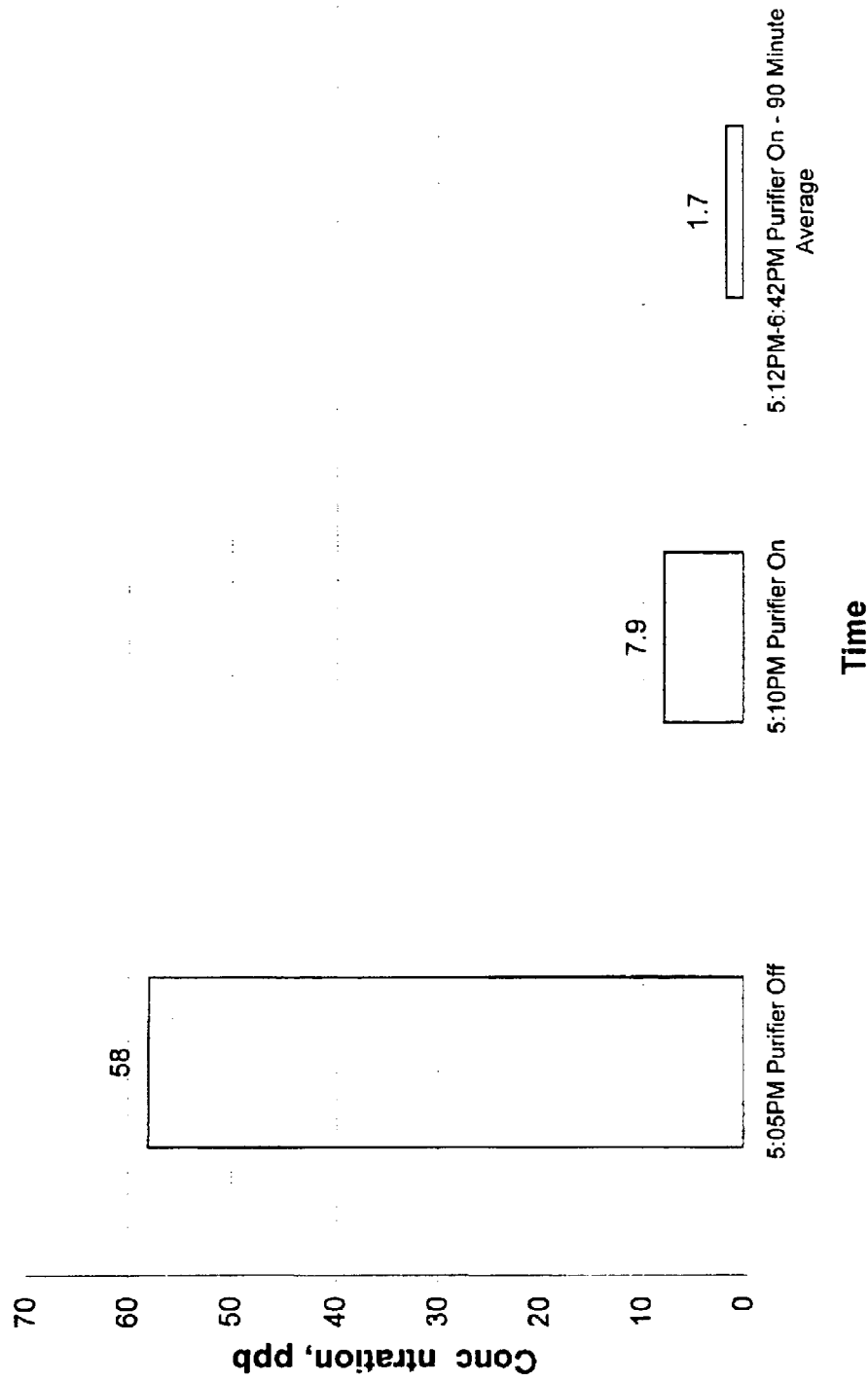
Figure 24:
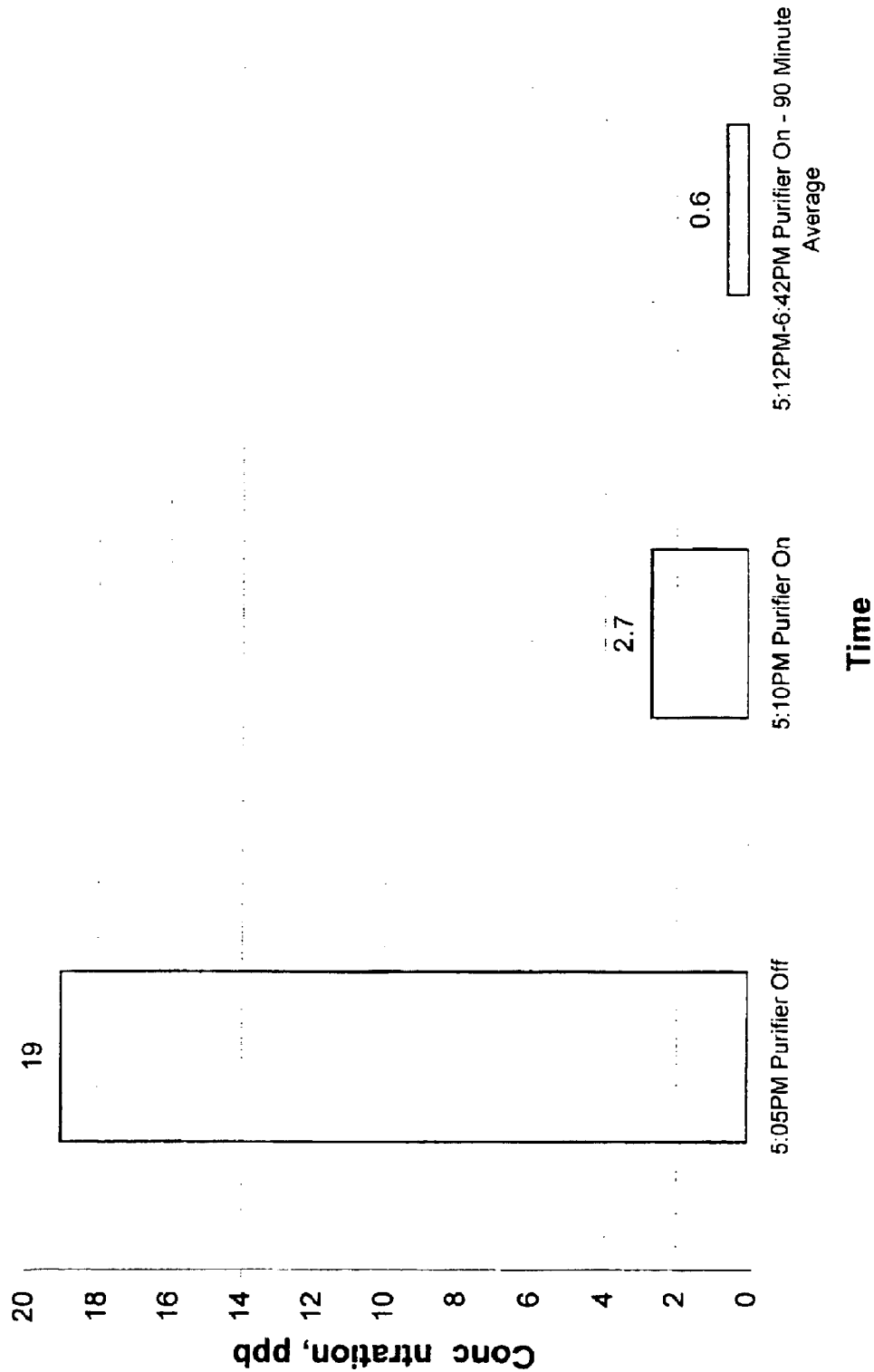
Figure 25:
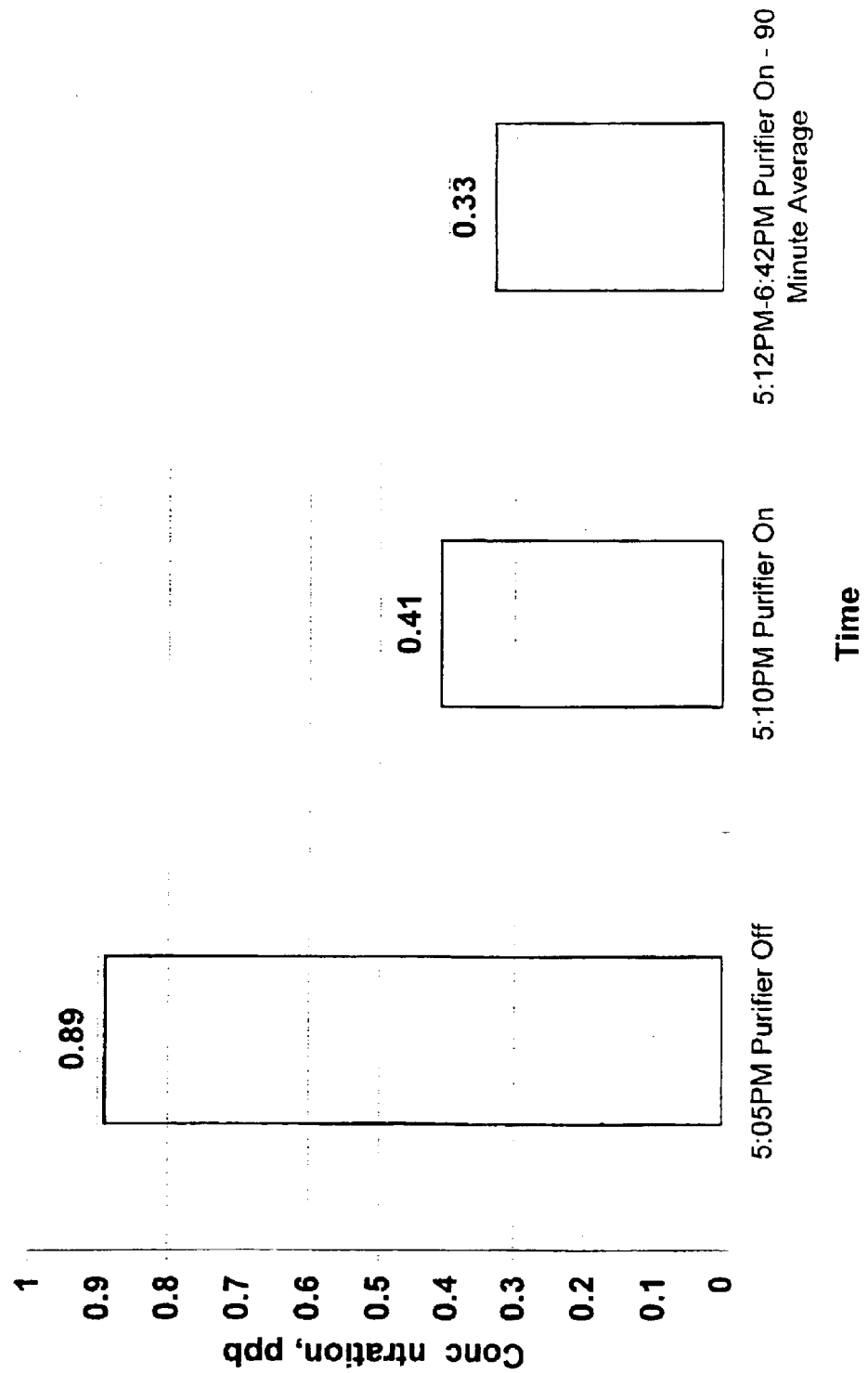
Figure 26:
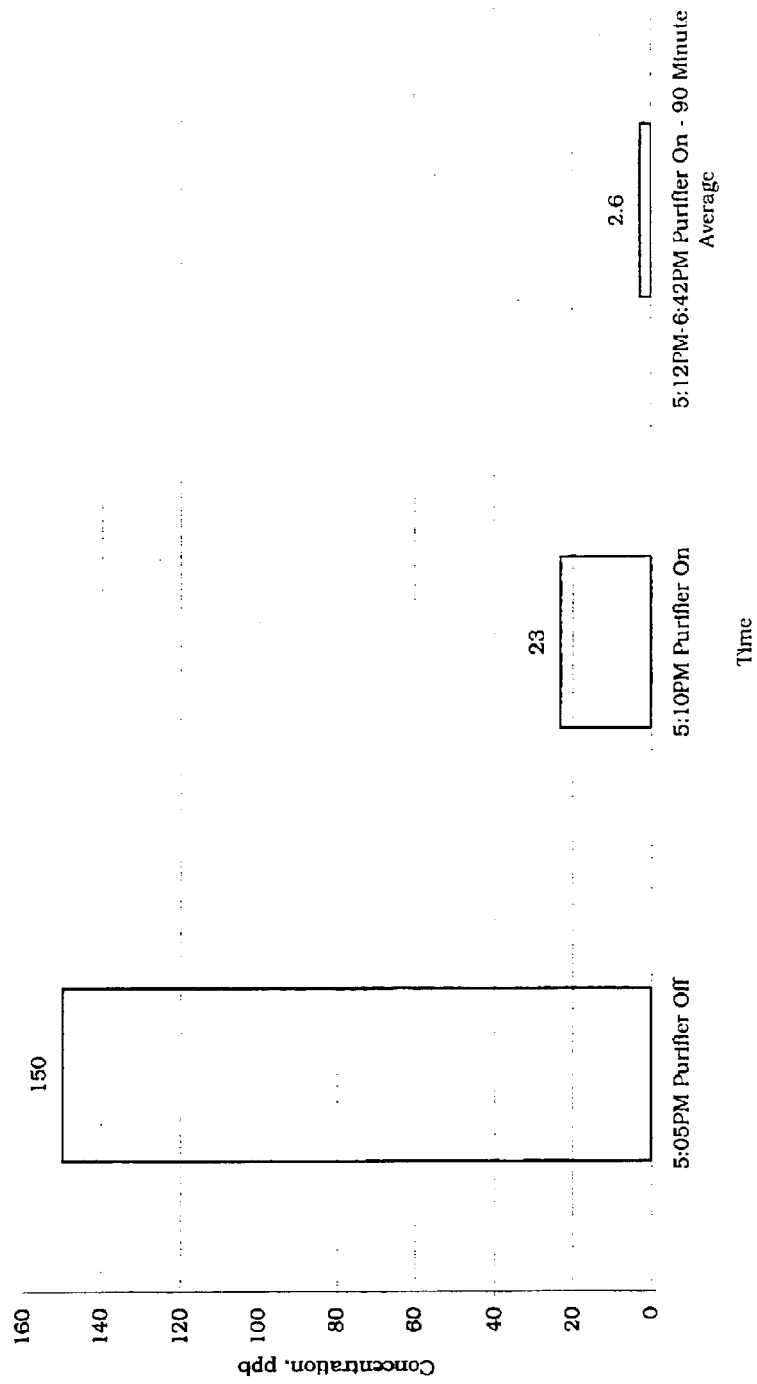

FIG. 20 is a bar graph representation of data with respect to benzene, acquired in Los Angeles, Calif. on Sep. 1, 2000 and later analyzed by Performance Analytical, Inc., Simi Valley, Calif., using EPA Method TO-14A. The air sample was collected using a Summa canister positioned in the C position of FIG. 8.

FIGS. 21–26 show analytical results from the samples of FIG. 20, analyzed at the same time and in the same manner as were those with respect to FIG. 20, but as to the aromatic hydrocarbons toluene, ethylbenzene,—and p-xylenes, and o-xylene; aliphatic 1,3-butadiene, and finally t-butylmethyl ether, respectively.

FIG. 27 is a summary concentration chart of test results in the cities of Portland, Oreg., Los Angeles, Calif., and Bangkok, Thailand, using the detector locations shown in FIG. 8, as these results are indicated in FIGS. 10–26. The major pollutants targeted by this invention are indicated, together with the relevant government health standards (in bold), pollutant levels found inside moving cars in nine separate scientific studies (of which one was the present study as to data collected when air purifier 10 was not in use), and finally the levels found when air purifier 10 was turned on. It may be noted that where possible, the more stringent of available ambient air standards was used as the "target."

FIG. 28 comprises footnotes that pertain to the material of FIG. 27. More specifically, these footnotes show the dates of data collection and types of testing that resulted in the mean concentration numbers shown in the right hand column of FIG. 27, those data indicating the typical performance of air purifier 10 for each pollutant tested.

Industrial Applicability

From these data, it is evident that air purifier 10 achieves levels of air purification not previously reported. A part of that success derives from identifying specific pollutant levels as indicated in government standards as "targets" for which lower pollutant levels are to be achieved. The means by which those lower levels were achieved center on the decision, contrary to the industry practice, to concentrate on improving environmental conditions for vehicle cabin inhabitants for health reasons rather than just minimal customer satisfaction.

Placement of the air purifier outside of the vehicle ventilation system, likewise contrary to industry practice, was one means by which that goal was achieved, and centers on (a) the constructive use of cabin space for placement of air purifier 10 or console 114; (b) the development of an aesthetically pleasing and useful structure for each of those placements; (c) and a compactness in the structure of air purifier 10 so as to allow both of those features. This placement avoids one problem in the prior art, namely, the safety of the passengers with respect to devices that have been installed in the cabin head liner, giving the danger of bumping the head, and any kind of placement on the vehicle floor (except between seats, or elsewhere in larger SUVs where such placement can be accommodated), where the device may be bumped into or tripped over. Given that various types of trays or holders for coins, cups, audio tapes or CDs and the like have now become common in the cabin areas of automobiles, and have been placed in both the front and rear seat areas of such vehicles, either one of air purifier 10 or console 114 would be expected to have similar customer acceptance and approval, while at the same time, and most importantly, either of those would also be purifying the cabin air, that function within a console not being present in the prior art.

Another aspect lies in the innovation wherein the filter media packets were structured as a quantity of filter medium enclosed within a filter medium envelope that was itself formed from a non-woven, at least gross particulate filter material. Standard industry practice, in packaging up a quantity of filter medium, has been simply to use a "scrim" material that does not itself contribute any filtration function. At least some at least gross particulate filtering thus occurs at each of the filter media packets, contributing to better use of the HEPA filter for its best purpose, namely, the capture of fine $PM_{2.5}$ particles that ordinary filters cannot capture. It has also been shown that yet another type of air filter can be formed simply by folding up a quantity of carbon impregnated fiber.

Yet another aspect of the invention lies in the use of a packed bed filter structure, which to the knowledge of this inventor has not been used before in the cabin air filtration industry, for the apparent reason that the emphasis on maintaining a high velocity of air flow, given that the filtering device was to be placed within the vehicle HVAC system, would preclude any use of packed bed filters. It was thus quite unexpected that effective air purification could in fact be accomplished by passing air through not only a total of 3 inches (i.e., four filter media packets each of ¾ inch depth) of tightly packed filter media, but also through eight layers of the at least gross particulate medium forming the envelopes surrounding those packed beds, through a HEPA filter, and finally through a carbon impregnated fiber filter, but the data set out herein show that result.

Another unexpected result of this experimentation, as determined from varied usage of the several embodiments of the invention, lies in the long life of air purifier 10. For example, the input air speeds of the 7 m³/min (250 CFM) embodiment located within the trunk carried out on Feb. 6, 2001, which embodiment contains the filter media packets and other filters used in the tests reported herein, indicated speeds of 6.1 m/sec (1200 ft/min) on a "low" speed setting and 8.1 m/sec (1600 ft/min) on a "high" speed setting, thus showing no detectable degradation in performance. The mileage records for the vehicle in which that embodiment has been installed (excluding the Bangkok, Thailand tests for which a rented vehicle was used) indicate such usage over slightly more than 2 years, and a mileage during that period of 30,560 miles.

The utility of employing a "low" and a "high" level operation of air purifier 10 by way of switch 60 was also demonstrated. In usage, it was found that once the desired pollution level within the vehicle cabin had been achieved (through use of either level), it was possible to maintain that level (i.e. the particulate level was in single digits) over several hours by operating at the low level. Upon chance encounter of a substantial pollution source (e.g., a diesel truck), the pollution level would be seen to rise, but could be reduced again by switching to the high level for a short period.

In employing air purifier 10 to eliminate airborne infectious agents, the contraction of some new disease while in a hospital is well known. With tuberculosis, for example it has become the practice of some hospitals to provide for such patients rooms that have "negative pressure," which is to say that none of the air of that room is allowed to escape therefrom, a pressure differential being provided between that room and the hallways or the like for that purpose. For use in a hospital environment, it would fall within the scope of the invention to provide air purifier 10 with filters especially adapted to capture those and other infectious agents, and also filters more closely adapted to capture "hospital smells," e.g., formaldehyde and methyl alcohol. Hospitals, and also nursing homes, often have air filtration systems that, like many of those installed within the ventilation systems of motor vehicles, are directed primarily to the removal of particulate matter and odors, not necessarily including the pollutants that in fact present the greatest health risk.

With respect to the air in the cabins of aircraft, such air at "takeoff" will usually include some quantity of the pollutants that arise from the operation of aircraft engines, including both that from nearby aircraft and that from the particular aircraft itself, and the types of pollutants deriving therefrom will be somewhat different from those arising from roadway motor vehicles, and again other types of filters may be provided to an air purifier 10 that would target those particular pollutants. Other types of environment that present their own unique distribution of pollutants are found in mobile homes, RVs (Recreational Vehicles), manufactured homes, houseboats, yachts, and the like. With respect to motor vehicles having separate cabin and cargo spaces, the embodiment described above which places air purifier 10 within the vehicle trunk may be taken to be exemplary of other such applications wherein air purifier 10 is placed within the cargo space and is similarly connected through air ducts to the cabin. Such application may be particularly desired (in the case of cargo trucks adapted to receive the installation of such air ducts) when the truck is routinely used to carry odoriferous cargo such as livestock, farm produce, or garbage, the odors of which the user of the truck would like to avoid insofar as possible.

The invention having thus been shown and described, it will be understood by those of ordinary skill in the art that other arrangements and disposition of the several aforesaid components, the descriptions of which are intended to be illustrative only and not limiting, may be made without departing from the spirit and scope of the invention. Each of these applications of the invention, as adapted by the means described herein to best meet the needs of each of those specific environments, would be deemed to be encompassed by the invention. Therefore, the spirit and scope of the invention must be identified and determined only from the following claims and equivalents thereof.

I claim:

1. An air purifier for the reduction of specific air pollutants within motor vehicle cabins and similar enclosed structures comprising:

a portable housing having an air inlet in communication with the cabin of a vehicle and similar enclosed structures, a filter assembly in communication with the air inlet and air outlet and selected filter media to remove specific pollutants from air flowing through the filter assembly, an air outlet in communication with the cabin of a vehicle, a motorized fan operable to draw air into the air inlet, through the filter assembly and through the air outlet;

the motorized fan operable from a readily accessible power source;

the air purifier functionally independent of but also operable in conjunction with any heating, ventilation or air conditioning system in a motor vehicle and other similar apparatus;

the housing removably attachable to at least one preselected surface within or on a motor vehicle or other enclosed structure; and the air purifier adapted to accept for purification only that air which is contained within said cabin or similar enclosed structure, to the exclusion of immediate connection to air entering said cabin or similar enclosed structure from areas external thereto.

2. The air purifier of claim 1 further comprising at least one packed bed filter through which ambient air to be purified is passed.

3. The air purifier of claim 1 further comprising at least one HEPA filter through which ambient air to be purified is passed.

4. The air purifier of claim 1 further being a self-contained unit.

5. The air purifier of claim 1 further comprising air inlet and air outlet apertures least one of which is attached an air conduit extension.

6. The air purifier of claim 1 further comprising at least one of said filter locations adapted to receive a HEPA filter.

7. The air purifier of claim 6 includes a blower employing an electric motor that is operable from DC electrical power of a motor vehicle, or AC electrical power from a similar enclosed structure, and such power means includes a power cord attachable to a power outlet.

8. The air purifier of claim 7 further comprising said DC electric motor being operable at a plurality of speeds.

9. The air purifier of claim 6 being disposed within a trunk region of a motor vehicle, and wherein said air inlet and air outlet hole have fluid connection to a cabin area of said motor vehicle.

10. The air purifier of claim 9 wherein said air outlet hole connects to an air outlet disposed within an armrest/console, which is disposed on a rear seat of a motor vehicle.

11. The air purifier of claim 6 wherein at least one of said at least one filter media packet includes a packed bed of filter medium.

12. The air purifier of claim 6 wherein at least one filter media packet comprises:

a first grate;

a second grate; and at least one filter medium disposed between said first grate and said second grate.

13. The air purifier of claim 12 wherein at least one of said at least one filter media packet includes a filter medium envelope within which is disposed said at least one filter medium.

14. The air purifier of claim 13 wherein said filter medium envelope is formed of a non-woven, at least gross, as opposed to fine, particulate filter material.

15. The air purifier of claim 6 wherein at least one filter media packet is selected from the group consisting of a desiccant-sorbent packet, a carbon particle packet, a catalyst packet, and a coconut based packet.

16. The air purifier in claim 15 wherein at least one filter media packet, commencing from said air inlet, are disposed in the order of:
   a desiccant-sorbent packet;
   a carbon particle packet;
   a catalyst packet; and
   a coconut based carbon packet.

17. The air purifier of claim 16 further includes at least one HEPA filter downstream of said filter media packets.

18. The air purifier of claim 17, further includes at least one impregnated carbon fiber filter downstream of said HEPA filter.

19. The air purifier of claim 1 further comprising said housing or cover having a seat belt bracket for connection to a motor vehicle seat belt.

20. The air purifier of claim 1 including said housing or cover having a seat belt bracket for connection to a motor vehicle seat belt.

21. The air purifier of claim 1 further includes said blower having a DC electric motor that is operable from DC electrical power of a motor vehicle, and said power means includes a power cord that is attachable to a DC power outlet in a motor vehicle; or having an AC electric motor that is operable from AC electric power available in similar enclosed structures.

22. The air purifier of claim 21 further comprising said DC electric motor being operable at a plurality of speeds.

23. The air purifier of claim 1 further comprising said housing being disposed within a trunk region of a motor vehicle, and wherein said air inlet and air outlet hole are in fluid connection to a cabin area of said motor vehicle.

24. The air purifier of claim 23 further comprising an air outlet in communication with said air outlet hole and is disposed within an armrest/console disposed on a rear seat of a motor vehicle.

25. The air purifier of claim 1 wherein at least one of said at least one filter media packet includes a packed bed of filter medium.

26. The air purifier of claim 1 wherein at least one of said at least one filter media packet comprises:
   a first grate;
   a second grate; and
   at least one filter medium disposed between said first grate and said second grate.

27. The air purifier of claim 26 wherein at least one of said at least one filter media packet includes a filter medium envelope within which is disposed said at least one filter medium.

28. The air purifier of claim 27 wherein said filter medium envelope is formed of a non-woven, at least gross, as opposed to fine, particulate filter material.

29. An air purifier according to claim 1 wherein the specific air pollutants include but are not limited to: benzene, carbon monoxide, ozone, nitrogen dioxide, sulfur dioxide, lead, particles with diameters of 10 micrometers or less and particles with diameters of 2.5 micrometers or less, which include but are not limited to: lead, cadmium, mercury, asbestos, disease-causing bacteria, viruses and fungi, carcinogenic volatile organic compounds that are attached to the said particles, sulfates, nitrates and diesel particulate soot.

30. A method of reducing specific pollutants from air within a motor vehicle cabin or similar enclosed structure, comprising the steps of:
   removably attaching an air purifier that is operable by power onto a surface within said cabin or similar enclosed structure;
   said air purifier including an air inlet and an air outlet, both of said air inlet and air outlet being in direct fluid connection with the interior of said motor vehicle cabin or similar enclosed structure while having no direct fluid connection to any HVAC or other ventilation system that enters into said motor vehicle cabin or similar enclosed structure from the exterior thereof;
   connecting to said air purifier a proximal end of a power line adapted to transmit DC power; and
   connecting a distal end of said power line to a source of power that is accessible from within said cabin or similar enclosed structure.

31. An air purifier for the reduction of specific pollutants from the cabin of a vehicle and similar enclosed structures, comprising:
   a housing including an air conduit extending through said housing, said housing having on at least part of the exterior thereof an upholstery cover or other cushioning substance;
   an air inlet in fluid connection with a first end of said air conduit;
   an air outlet hole in fluid connection with a second end of said air conduit;
   a multiplicity of filter locations disposed within said air conduit, at least one of said filter locations being adapted to receive a filter media packet within said air conduit;
   at least one filter media packet disposed within one of said multiplicity of filter locations and selected to capture at least one predetermined air pollutant from air passing through said air conduit;
   a blower in fluid connection with said air conduit and adapted to draw air into said air conduit through said air inlet and discharge air out of said air conduit through said air outlet hole; and
   a connector for connecting to a power source for operating said blower.

32. The air purifier of claim 31 wherein said at least one filter media packet is selected from the group consisting of a desiccant-sorbent packet, a carbon particle packet, a catalyst packet, and a coconut based carbon packet.

33. The air purifier of claim 32 wherein said at least one filter media packet, commencing from said air inlet, are disposed in the order of:
   a dessiccant-sorbent packet;
   a carbon particle packet;
   a catalyst packet; and
   a coconut based carbon packet.

34. The air purifier of claim 33 further comprising a HEPA filter downstream of the plurality of filter media packets.

35. The air purifier of claim 34 further comprising at least one carbon impregnated fiber filter downstream of said HEPA filter.

36. An air purifier according to claim 31 wherein the specific air pollutants include, but are not limited to: benzene, carbon monoxide, ozone, nitrogen dioxide, sulfur dioxide, lead, particles with diameters of 10 micrometers or less and particles with diameters of 2.5 micrometers or less, which particles include, but are not limited to: lead, cadmium, mercury, asbestos, disease-causing bacteria, viruses and fungi, toxic volatile organic compounds that are attached to the said particles, sulfates, nitrates and diesel particulate soot.

37. An air purifier operable to reduce concentration levels of specific pollutants in the passenger cabin of a vehicle and similar enclosed structures, to levels at least as low as the following US-EPA National Ambient Air Quality Standards for at least one of the following:

Carbon Monoxide-20 parts per million, Ozone-80 parts per billion, Nitrogen Dioxide-250 parts per billion, Sulfur Dioxide-636 parts per billion, Lead-1.5 micrograms per cubic meter, Particulate Matter 10 micrometers and less in diameter-150 micrograms per cubic meter, Particulate Matter 2.5 micrometers and less in diameter-65 micrograms per cubic meter; and reducing Benzene to levels at least as low as an ambient air quality standard in Europe of 10 micrograms per cubic meter (or 3 parts per billion);

the air purifier comprising:

a housing including and air inlet, and air outlet, a filter assembly disposed between the inlet and the outlet, and a blower for drawing an air flow from the interior of the vehicle and similar enclosed structures into the air inlet, through the filter assembly and through the air outlet into the interior of the vehicle and similar enclosed structures.

38. An air purifier according to claim 37 wherein the Particulate Matter includes, but is not limited to: lead, cadmium, mercury, asbestos, disease-causing bacteria, viruses and fungi, toxic volatile organic compounds that are attached to the said particles, sulfates, nitrates, and diesel particulate soot.

* * * * *